Jan. 3, 1961

G. DIRKS 2,967,295

STORING OF SIGNALS

Filed March 30, 1955

INVENTOR
Gerhard Dirks
BY
Michael S. Striker
ATTORNEY.

Jan. 3, 1961   G. DIRKS   2,967,295
STORING OF SIGNALS
Filed March 30, 1955   18 Sheets-Sheet 4
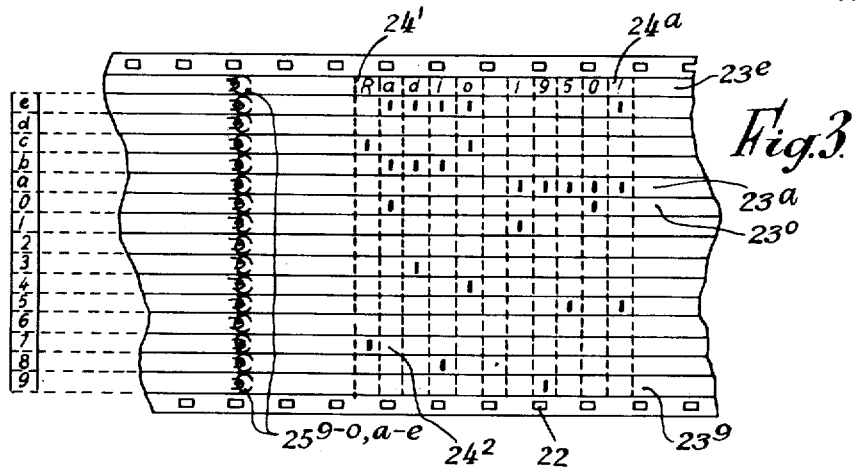
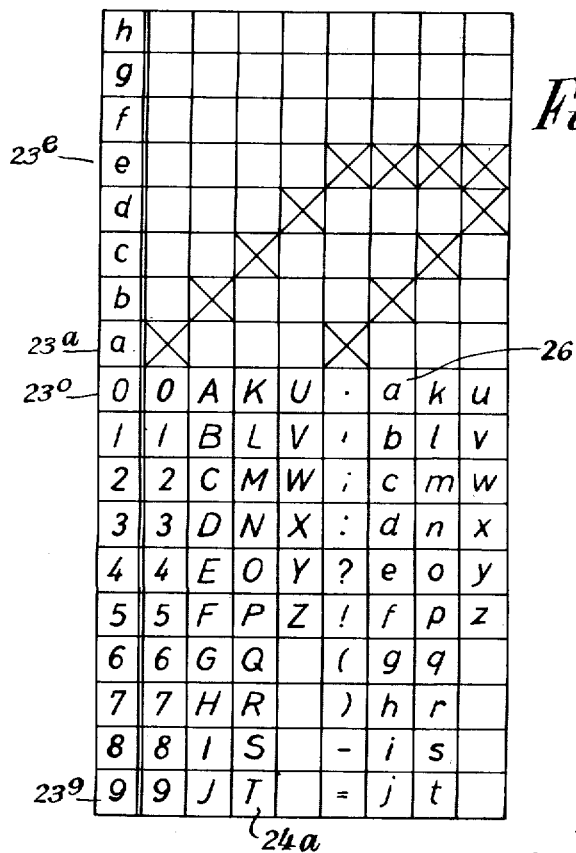
INVENTOR
Gerhard Dirks
BY
ATTORNEY

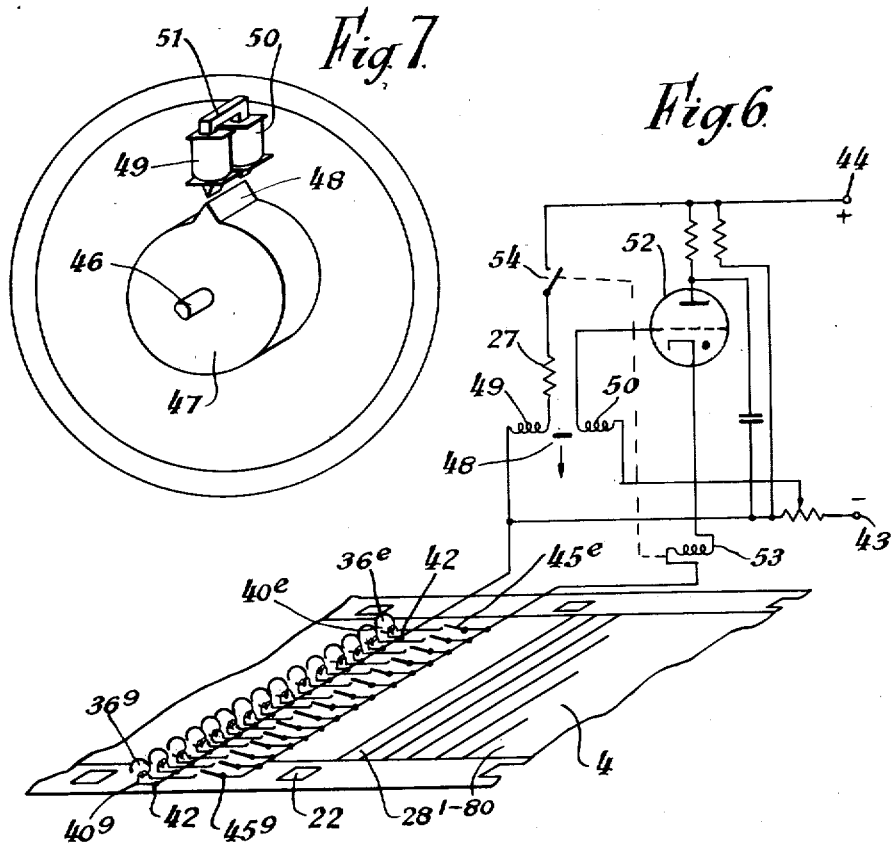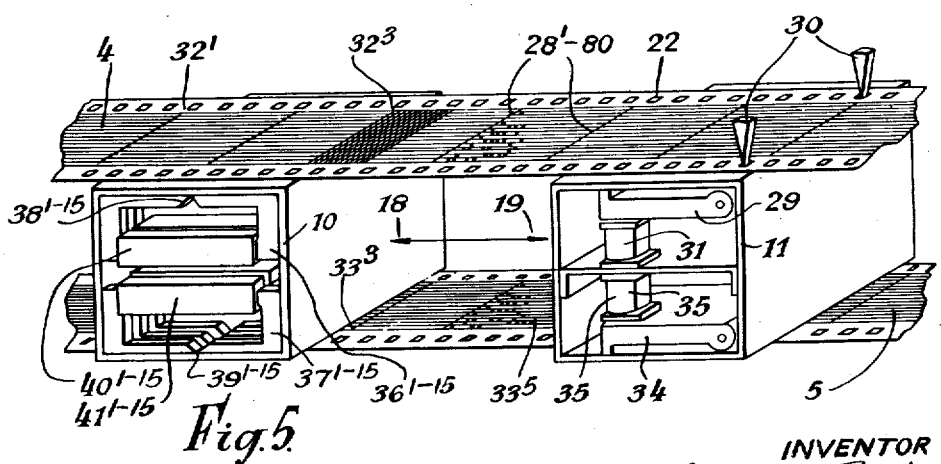

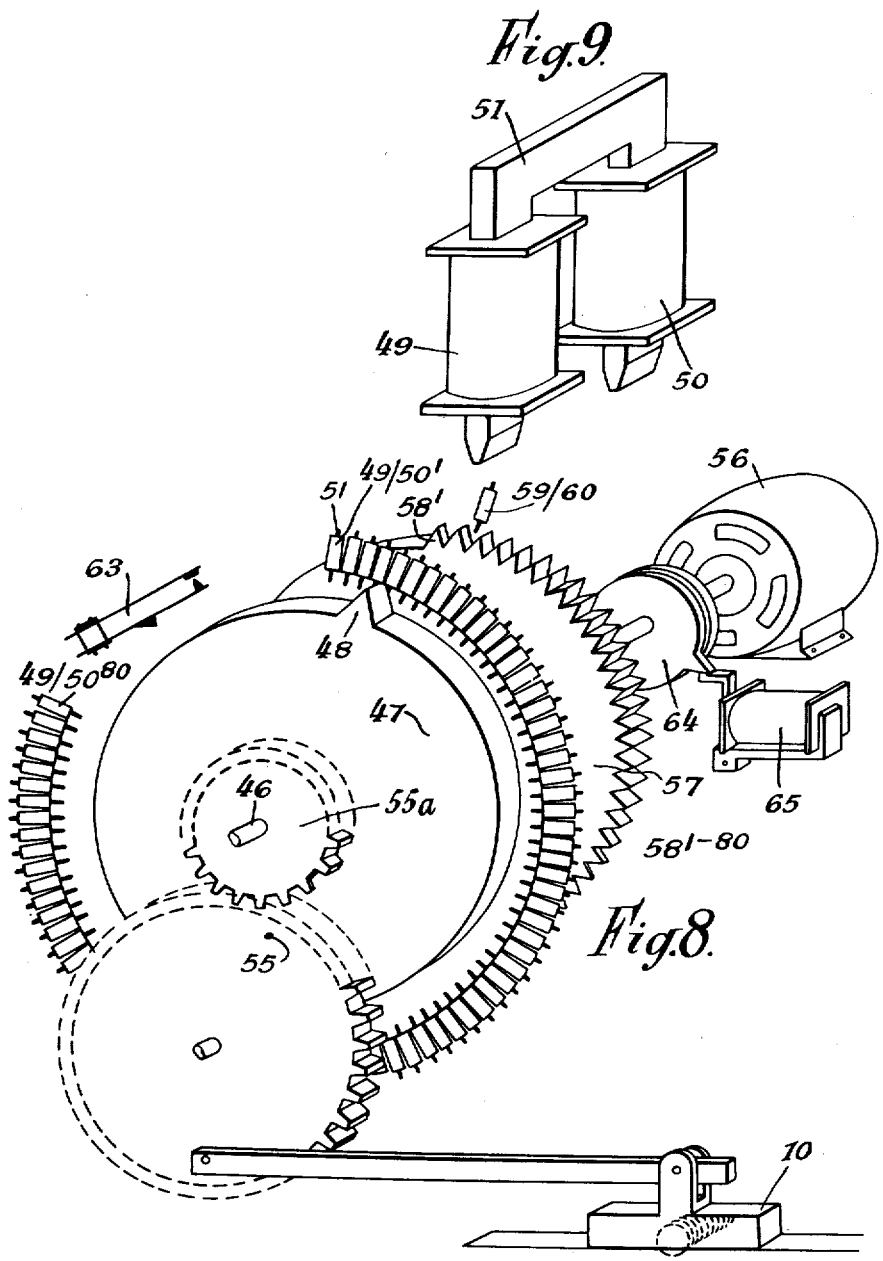

Jan. 3, 1961 G. DIRKS 2,967,295
STORING OF SIGNALS
Filed March 30, 1955 18 Sheets-Sheet 7

INVENTOR
Gerhard Dirks
BY Michael S. Striker
ATTORNEY

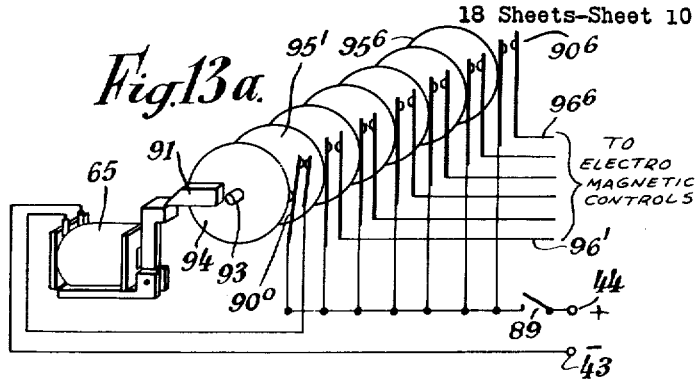
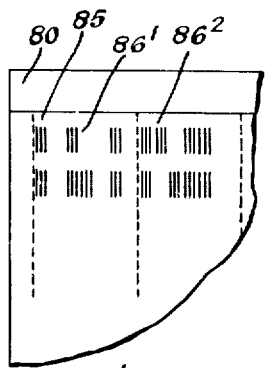
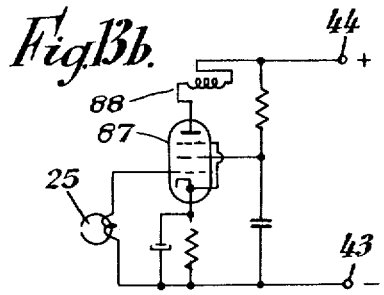
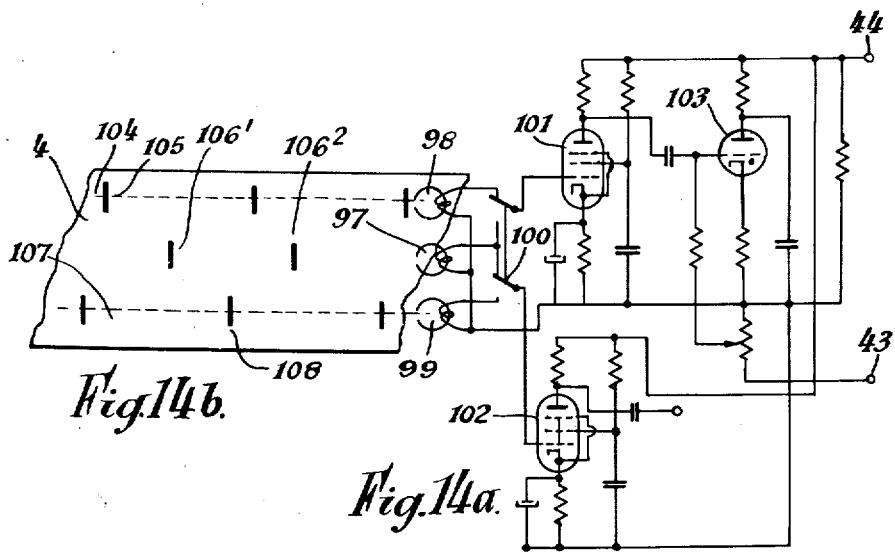

Jan. 3, 1961

G. DIRKS 2,967,295

STORING OF SIGNALS

Filed March 30, 1955

INVENTOR
Gerhard Dirks
BY
Michael S. Striker
ATTORNEY

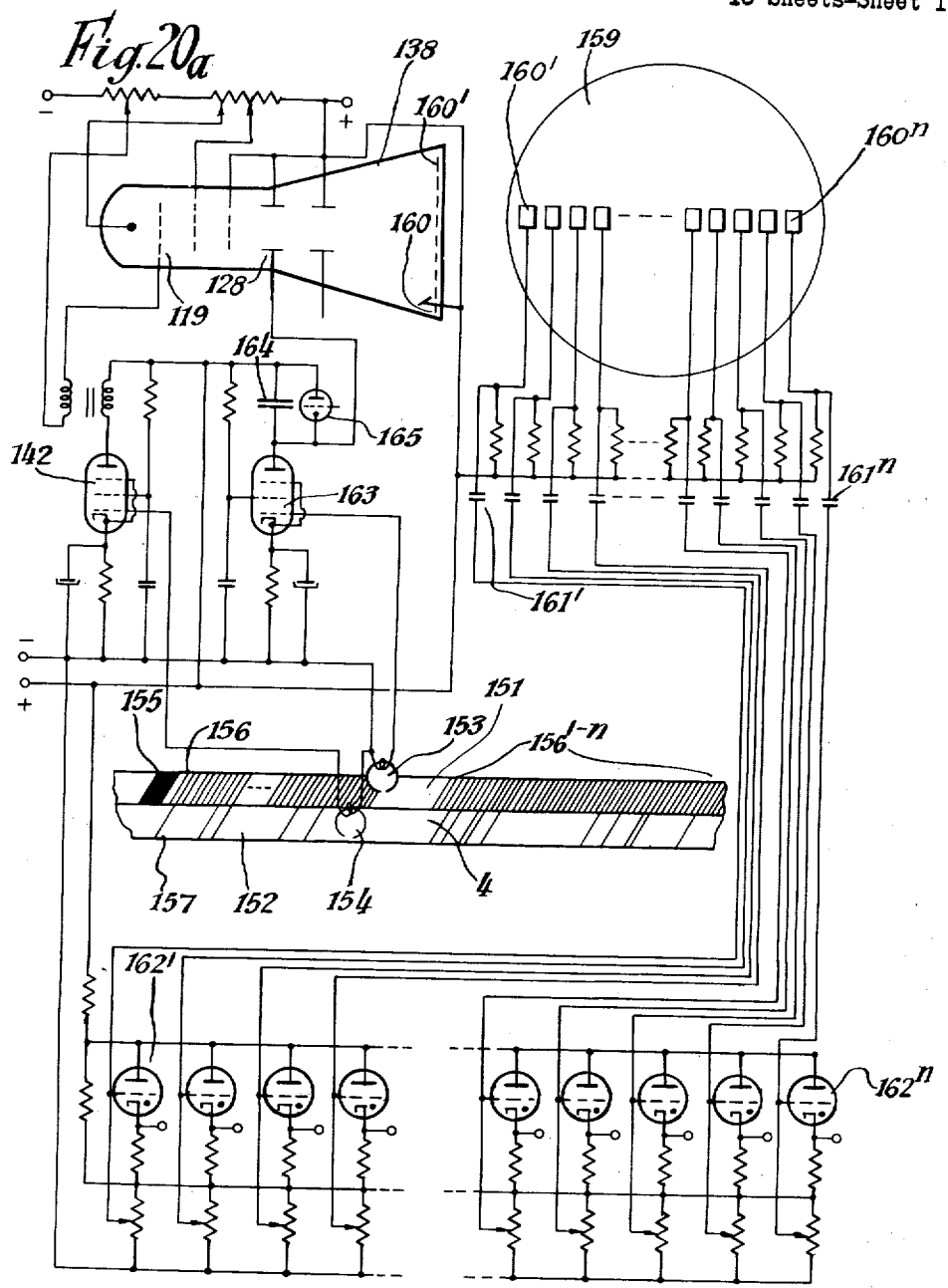

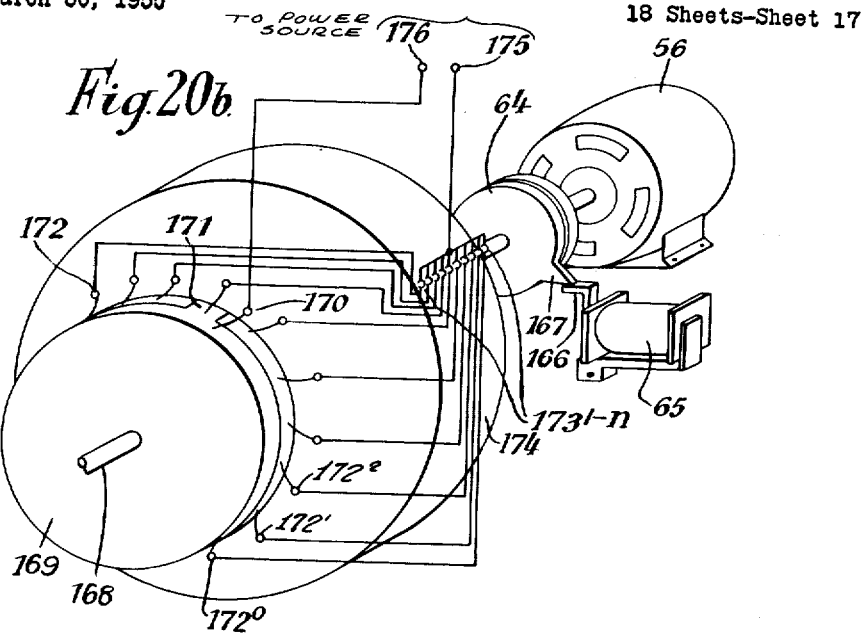
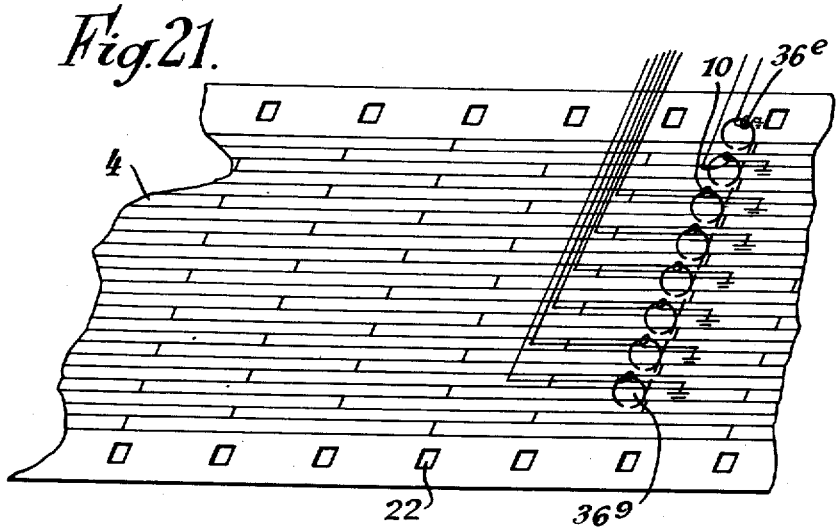

United States Patent Office 2,967,295
Patented Jan. 3, 1961

2,967,295
STORING OF SIGNALS

Gerhard Dirks, 44 Morfelder Landstrasse,
Frankfurt am Main, Germany

Filed Mar. 30, 1955, Ser. No. 498,043

Claims priority, application Germany Oct. 1, 1948

5 Claims. (Cl. 340—172.5)

This application is a continuation-in-part of application Serial No. 101,032, filed June 24, 1949.

This invention relates to the storing of signals on magnetizable signal carriers such as tapes, strips or the like, including larger elements which in addition to having the magnetizable storage areas have also one or more other areas for the visual indication (e.g. printing) of the information represented by the stored signals.

The invention provides a method of storing signals on a magnetizable carrier wherein the signals have either a defined local position relatively to a marking or formation on the carrier or a defined timed position relatively to pulse sequences, frequencies or the like.

The invention may comprise signal storage means including one or more magnetizable signal carriers which are contained preferably on or in a non-magnetizable material, such as film, paper or the like, or consist themselves of magnetizable material, in form of strips, tapes, sheets or the like, for the purpose of storing and re-sensing signals, whereby on the signal carriers there are recorded, sensed or erased successively or simultaneously, amplitude or frequency modulation signals or different lengths of a frequency modulation or the like, representing different data and/or commands, which have defined positions relatively to the perforated edges or other markings on the carrier, or to control signals recorded on the signal carrier, or to a control signal for electronic switches on a signal carrier or to synchronizing or switching signals for example pulses for pulse distributors.

In general the signals for the different digit values, characters or commands on the magnetizable tape have a definite position either with respect to the edge of perforations or other marks on the tapes, strips or the like, or with respect to control frequency signals recorded on the magnetic carrier for controlling an electronic switch, or alternatively with respect to synchronizing signals for a signal distributor.

The selective recording, sensing, checking or comparing means which operates with such tapes, strips or the like comprise either locally displaced signal heads or timed switches for timed signal displacements.

In the accompanying drawings:

Fig. 3 is a diagrammatic representation of signals on a tape indicating the expression "Radio 1950";

Fig. 4 is a code diagram illustrating the significance of signals in certain relative positions on a tape or like carrier;

Fig. 5 is a perspective view of a film-transporting and signal recording and sensing means for input and output tapes;

Fig. 6 is a circuit diagram illustrating the selective operation of signal heads on a magnetizable tape, in dependence on a distributor;

Fig. 7 is a perspective view of an inductive distributor for use in the circuit shown in Fig. 6;

Fig. 8 is a perspective view of another form of distributor or selecting switch;

Fig. 9 is a perspective view of one of the pairs of magnet coils shown in Fig. 8;

Figs. 13a, 13b and 13c show means for distributing information signals relatively to a start signal;

Figs. 14a and 14b illustrate the use of zero signals and terminating signals for determining the significance of information signals;

Fig. 20a is a switching diagram for the control of a set of relay tubes by a stepwisely movable tape or other record means having one synchronization and one information track;

Fig. 20b shows a stepwisely operable cyclic storage with magnetizable layer for selective or repeated sensing of signals transferred from the tape of Fig. 20a to the said magnetizable record means.

Fig. 21 illustrates the lateral movement of signal heads to increase their capacity within a given unity.

Figure 1:
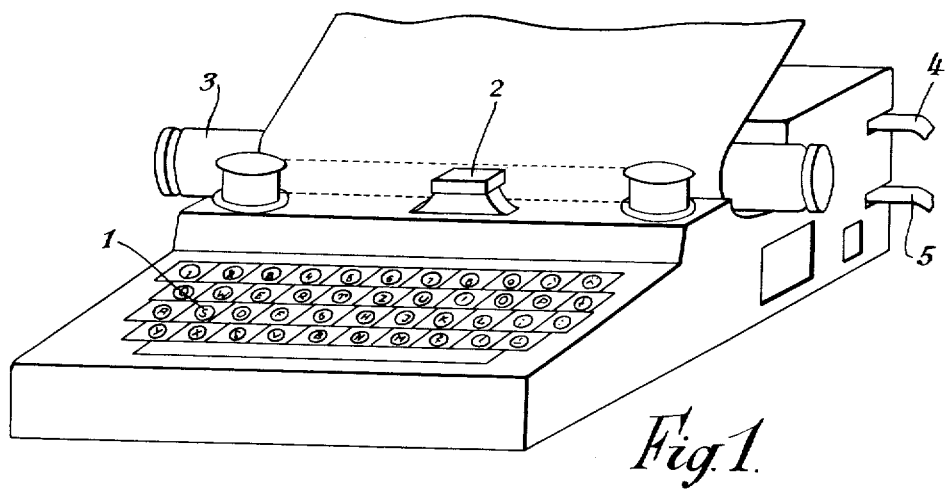
Fig. 1 is a perspective view of the front of an electric typewriter or printing machine, with full keyboard, in which the improved signal storage is embodied in magnetizable tapes.

Referring to Fig. 1 there is an electrically controlled typewriter with a keyboard 1, the printing mechanism 2, the platen roller 3 and magnetizable tapes 4 and 5. The printing mechanism can be either a type-character system or an electrically controlled dot or line-printing system.

The magnetic tape control can be used for different tasks. It can be used for instance for the magnetic storing of a typed text in combination with the simple typewriting mechanism. The signals for the typed text are recorded character by character on the magnetizable tape as typing proceeds, from whence they can be sensed and written again by the mechanism 2 for a repeated typing. Hereby a renewed typing of a text by operating the typing keys is only necessary for those parts of the text which have to be changed. All the other characters can be retyped automatically by means of the magnetic tape 4.

If, for instance, propaganda-letters are to be printed, tape 4 can have the recorded signals for the general text of the letter for repeated printing, whereas a second tape 5 has the supplementary text which changes from letter to letter, for instance the address, the name, or special lines or characters within the text.

Such a combination of two tapes can be used also for correction tasks, if, for instance, an originally typed text is recorded on tape 4 and is to be re-typed with certain corrections. These corrections can be recorded in the supplementary tape 5. It is then only necessary, to indicate by a mark or other command signal, that at a given place in the text the sensing is switched from tape 4 to tape 5, and from there back again to tape 4 to the passage in the original text which follows the correction.

Furthermore, the combination of these two tapes can be used in such a way, that both tapes allow for correcting the text before it is printed. In this case the typist depresses in the usual way a certain number of keys for characters, for instance for ten characters or for a line of characters, whereby contacts are closed, but no characters are printed. The signals for the depressed keys are recorded on one of the tapes 4 or 5. The printing of these recorded characters takes place either after a certain command or automatically, if the machine is not stopped, i.e. the recorded text is sensed part by part or line by line, and printed, if no corrections have been made. During the sensing and automatic typing of these characters from tape 4, the recording of the next characters or line of characters takes place on tape 5, so that use of both tapes secures a full printing speed capacity with the possibility of corrections before the printing of the characters.

By combining a selectable storing device having these tapes with a keyboard, a very interesting shorthand record- and typewriting machine is obtained. In this case symbolized signals for a series of characters, for instance for those syllables, words or the like which are generally abreviated in shorthand systems are introduced into a tape from a selective storage means, when e.g. additionally to one key, a second, or third, fourth key etc. is simultaneously pressed down, to represent a syllable, word or the like. The signals for the said whole syllables, words etc. are recorded with the same speed by signals, as is ordinarily done with a character. It is even possible, to make visible the text recorded on the tapes or the like by suitable indicating means positioned at any desired location, so that a dictating person may read the text, while dictating it, if desired before printing. All this results in speeding up the printing process, since the striking of each of the individual keys is no longer necessary, in general save for special words not coded.

Both tapes can also be used as input and output means of a printing and computing mechanism, preferably operating with electric or electronic means. In this case tape 4 may for instance be used as input tape for the new text and computing tasks, whereas tape 5 may have for instance the task of a summarizing tape, on which the resulting sums of groups of numbers or total results are recorded, or on to which the signals of new sums or new balances are stored.

Furthermore, both tapes may be used in combination in such a way that for instance tape 4 contains the signals for the new daily input of magnetic tape data instead of punched cards, for instance in the sequence of account numbers, whereas tape 5 introduces into the machine supplementary standard signal series, as for instance for standard texts, or old sums or old balances in dependence on certain numbers of signal series of characters or commands for a ledger account.

Both tapes can also be used for the comparable task of the automatic typing and computing of invoices, payrolls, bookkeeping, etc. in such a way that the changing information is introduced into the machine for instance by tape 4, whereas the corresponding and necessary signals for supplementary standard information, for instance text, standard prices, standard deductions, and so on, are introduced by tape 5 by a selective sensing of selected areas of the tape without a preceding sorting or after a sorting process in which both sets of data have been sorted into a certain order, for instance on a ten-tape sorter as described in my co-pending application No. 498,044 filed May 30, 1955.

All these examples show that almost all the tasks which are effected by punched card machines, can be done by this automatic printing, computing, and sorting machine, controlled by magnetizable tapes. One of the great advantages of the use of such magnetizable tapes in comparison with punched cards lies in the possibility of correcting so that in all those cases in which a daily tabulating would require fresh summarizing cards for new balances and so on, or changed cards for other changing data, the tapes, strips, or the like can be repeatedly corrected and used again and again.

For another purpose, both tapes can be used for checking tasks by recording the same data twice. First the signals for characters, digits or commands which will operate the machines, are recorded on e.g. tape 4 by for instance one person on a typewriter with tapes (as shown) or in another device. Then the signals for characters, etc. are recorded a second time, either on tape 5 or at another part of tape 4, or on another machine or they are sensed in a second operation, so that both tapes or recordings can be compared either in the same machine during the second typing or in a separate checking or comparing device.

In many cases, the recording on the tapes will be carried through as a separate operation. In their simplest form these recording mechanisms contain a key board, a recording head system and a feeding arrangement for the tape. It is possible to combine such mechanism with other e.g. mechanically operating recording devices such as time-recorders, cash registers and the like.

Instead of magnetic storing on a tape, the recording can be effected also on other objects or on different material, as long as these are provided with a magnetic layer permitting recording and re-sensing by a magnet. Thus typing, duplicating, account paper and the like may for instance be provided with a magnetic substance, either embodied in the paper or applied to it, as a result of which they are able to store data for controlling sorting or complete book-keeping texts inclusive of figures, or even the whole contents of a document or the like.

For all the purposes above described, since the significance of the signals is dependent on their position, the signals must, according to the invention, have a definite local or timed relationship to fixed data such as a physical location on the signal carrier (e.g. the edge of a perforation) or a synchronizing signal, pulse or the like.

Figure 2A:
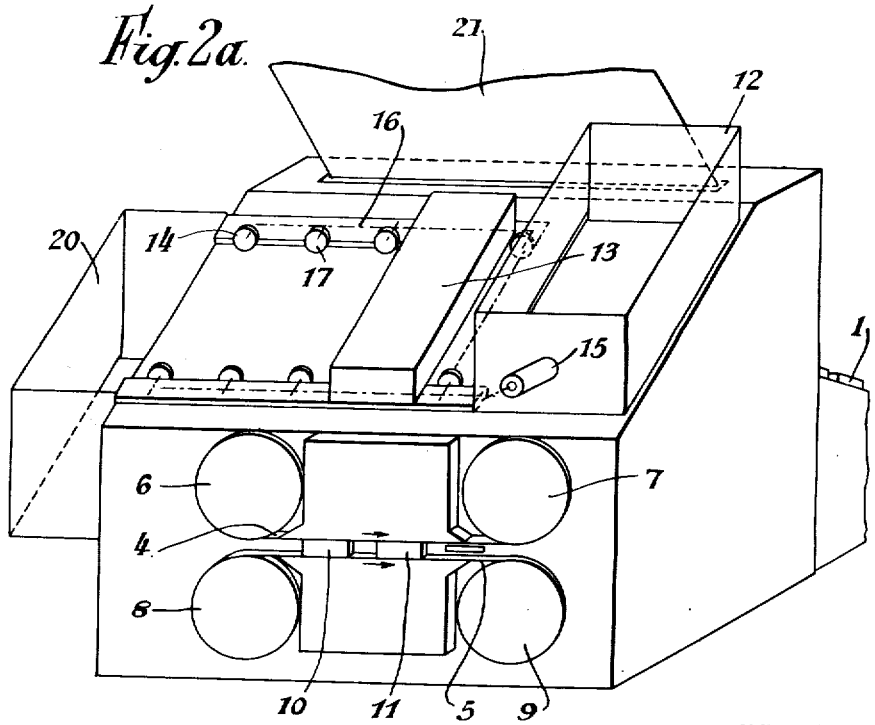
Fig. 2a is a perspective view of the rear portion of the same machine.

Fig. 2a shows the view from the rear of the machine. There are to be seen again the tapes 4 and 5 and a part of the keyboard 1. Special reels are provided, to enable a simple handling of the magnetic tape. Thus tape 4, during its operation, is uncoiled from reel 6 and recoiled on reel 7, whereas tape 5 is uncoiled from reel 8 and recoiled on reel 9. The sensing, erasing and recording of the tapes is effected by means of the group of signal heads 10 which operate for the upper tape 4 and for the lower tape 5.

The feeding of both tapes is effected by the stepwisely operating control-transport system 11 described later with reference to Fig. 5. The rear part of the machine, referring to Fig. 2a is furthermore provided with a feeding box or input box 12 for ledger-account sheets or the like having magnetizable signal-carrying areas, from whence ledger accounts are led one by one, from the bottom of the box to the printing device 13. The movement of the sheets is effected by the roll system 14 these rolls being driven by motor 15, shaft 16 and gears 17.

Furthermore there is shown the output box 20 for the printed ledger accounts, and a paper sheet 21 for receiving printed or typed information, for instance journal entries.

The signals can be arranged on the magnetic tapes in different ways. The signals themselves are either single magnetic signals of a certain direction and amplitude or are a certain sequence of frequencies or interruptions of a basic frequency whereby either the presence or the absence of a frequency can indicate a signal. Data may also be represented by changes in the phase or frequency of the recorded signals. In any case all these signals are preferably of the so-called "yes-or-no" signals system.

The recording of signals on the tape with their predetermined significance and the marking of the zero-positions by which their significance is determined can be effected in various ways. For instance, the edge of a perforation or hole within the tape can serve as zero position (e.g. the edge of perforations like those on photo-sensitive films). Instead of relating the zero-position to mechanical or physical characteristics of the tape itself, magnetic marks or signals can be recorded on the tape for the purpose of marking zero-positions or synchronizing marks. For machines with a low speed of operation this can be done in such a way that, similarly to the principle applied in the start-stop teletyper, either the breaking of the closed-circuit current modulation, or a start impulse will introduce every new symbol. The process of signal-recording hereby becomes independent of any mechanical parts or minor physical changes of the record means. The significance of signal can be given by the timing difference, between the start signal and the digit signal.

The two signals, the meaning of which is indicated by their timing difference, may be replaced by one single signal with a characteristic length. For instance, the beginning of it can be effective as a start signal, while the end of it corresponds to the said digit signal.

Alternatively, the leading edge of the signal can be effective as a digit signal, while the end of it occurs at a fixed time and so operates as a stop signal. It can be useful to provide a constant recording signal system, in which the signals will then appear as interruptions of the record.

For machines with a higher speed, however, the start-stop-signals will be replaced by the control frequency or synchronizing signals of for example an electronic switch, or of a motor electronically synchronized to the phase of the tape control frequency. In any case the synchronizing signal may be also the first or the last of a sequence of information signals.

Figure 2B:
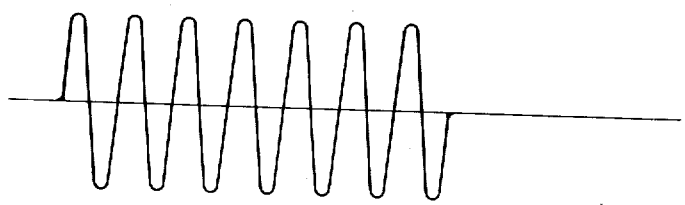
Figs. 2b–2p are diagrams illustrating some of the possible kinds of signals that can be stored according to this invention.
Figure 2C:
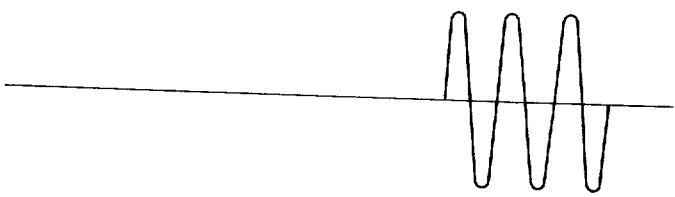
Figure 2D:
Figure 2E:
Figure 2F:
Figure 2G:
Figure 2H:
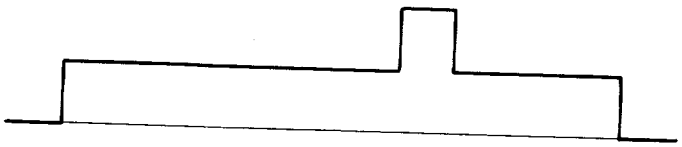
Figure 2J:
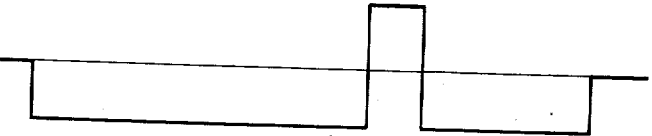
Figure 2K:
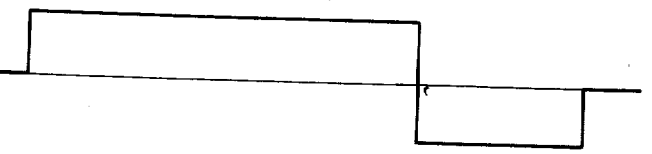
Figure 2L:
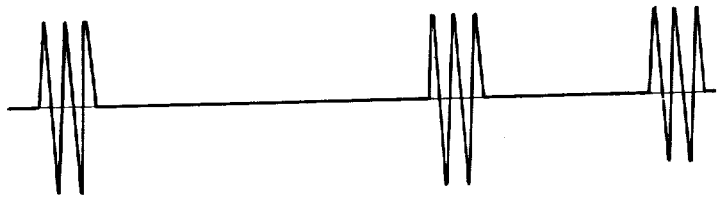
Figure 2M:
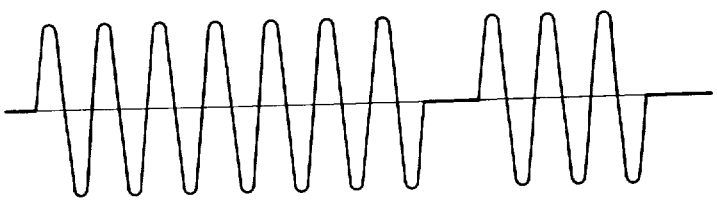
Figure 2N:
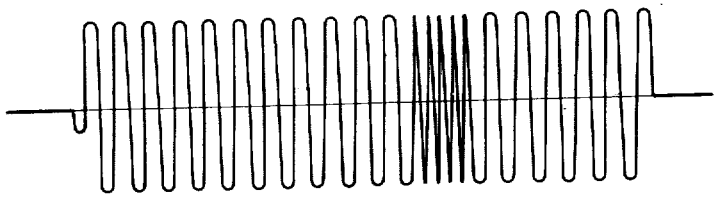
Figure 2O:
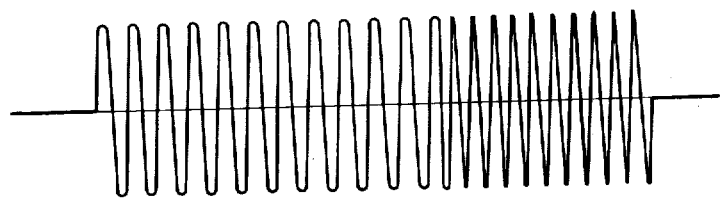
Figure 2P:
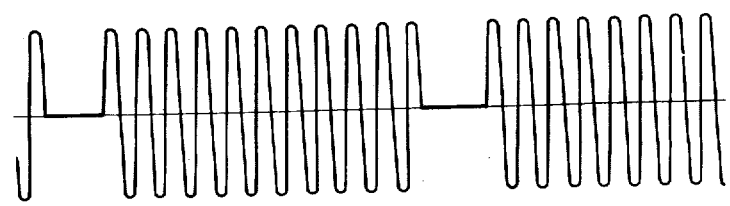

Figs. 2b–2p illustrate various forms of signals recorded on the record carrier, the resultant shapes being modified in accordance with various alternative recording arrangements which may be used in the carrying out of the invention.

Referring to Fig. 3 there is shown a magnetizable tape with an arrangement of signals which are recorded within horizontal lines and vertical columns. The illustrated divisions between the lines and columns are purely imaginative. The tape contains holes for positive feeding purposes, e.g. holes 22 known from optical films. Instead of an optical (photo-sensitive) layer the tape is provided with a magnetizable layer. In the case shown this magnetizable layer must be thought of as subdivided into horizontal lines $23^{0-9}$ for digit value signals and $23^{a-e}$ for additional signals for combinations, commands etc., and into vertical columns $24^{1-n}$ for denominations. This subdivision is only an imaginary one, effected by the relative movement and relative positions of the recording, sensing and erasing heads $25^{e-a, 0-9}$, which are, in the technical design, combined into a multi-signal-head system. If for example the characters and digits "Radio 1950" are to be recorded, the first vertical column $24^1$ of the magnetic tape, which has to represent the capital character "R" contains magnetic signals at the cross-points between columns $24^1$ and lines "7" and "c" ($23^7$ and $23^c$). The next character "a" is recorded within the next vertical column $24^2$ by the basic symbol "0" and the additional symbols "b" and "e" (comp. Fig. 4, field 26). The subdivision of the vertical columns $24^{1-n}$ can be effected differently according to the different tasks of printing, computing, storing and other organisational processes to be effected, comparable in its use to the vertical columns (denominations) of punched cards. It is evident that instead of parallel signal tracks, the arrangement of the signals may be otherwise disposed and the signal heads arranged correspondingly, for example by being moved transversely when sensing, recording or erasing.

In the arrangement shown, one or more of the signal heads may be selectively operated for sensing or recording in the same number of horizontal rows at each passage. Alternatively, only one or a few signal heads may be provided, which will be shifted across the tape to the next row or rows after each passage.

Fig. 4 shows as a diagram the co-ordination of signal combinations to characters, digit values or commands. The horizontal lines $23^{e-a, 0-9}$ have the meaning of the comparable horizontal lines in Fig. 3, and the vertical column $24a$ of this diagram (Fig. 4) shows the different meanings of combinations between digit value horizontal lines $23^{0-9}$ and supplementary signals in the upper lines $23^{a,b,c,d,e}$. In any one vertical row, a single signal in a horizontal row $23^{0-9}$ has the meaning of the corresponding digit 0–9, and a single signal in the horizontal row $23^{a-e}$ has the meaning of the corresponding letter $a$–$e$. However, when there is a signal both in a row $23^{0-9}$ and a row $23^{a-e}$ in the same vertical column, the signals in the rows $23^{a-e}$ change the meaning of the rows $23^{0-9}$ in the manner shown in the respective columns in Fig. 4. The arrangement of these signals in vertical rows corresponds to certain distances from the edges of perforation holes in the tape (e.g. hole 22 of Fig. 3). These holes may also be used merely as feeding holes, whereas the signals themselves have a recorded starting signal as a synchronizing signal for a distributor, in order to allow the recording of a greater quantity of signals in a given space. By these means the transport holes can be used as selecting means for groups of signals, whereas the individual signals are sensed in dependence on recorded synchronizing signals. For the usual tasks, a definite distance in relation to the edges of holes or other perforations can be used as a basis for synchronizing, as well for the selective feeding as for the definite sensing of the signals. The following description will show what advantages these perforated magnetic tapes have in their use, compared with the use of punched cards.

Fig. 5 shows details of the signal-head system 10 and the tape feeding system 11 for the tapes 4 and 5.

The signal head system 10 moves in each cycle of the operating means, for instance during each rotation of a multi-denomination magnetic disc computer (see my co-pending application No. 432,093 filed May 25, 1954), first from right to left in arrow-direction 18 and then back in arrow direction 19, to the extent of 80, 160, 240, etc. denomination $28^{1-80}$ a group of eighty denominational columns corresponds to one "unity" 32 of the tape, each unity being equivalent to one punched card). The tape 4 is stationary during the movement of the sliding signal head system 10 from right to left in arrow direction 18, but in certain cases moves by one "unity" to the right on the backward movement of the sliding signal-head system 10 in arrow direction 19. The movement of the tape by one "unity" 32 in arrow direction 19 is controlled by the upper part of the transportation control head 11 which moves in a manner similar to the sliding signal head system 10 to and fro by one "unity" first from right to left and then backward to right, corresponding to a certain number of perforations 22. Beginning with the reversing point of the movement of the signal head and transport-systems 10 and 11 in arrow-direction 18, and with the backward movement in arrow-direction 19, the lever 29 enters into the transport holes of the tape, for instance hole 22, the tape meanwhile being in a fixed position, locked by the registering teeth 30. The magnet-coil 31 effects that this stepwise transport is controllable. The stepwise transport of tape 4 is prevented, if the magnet-coil 31 moves the transportation lever 29 downwards because of energization of its windings, and lever 29 cannot then grip into the transportation hole 22 of the tape 4. This selective operation of the transport means for tape 4 is explained below.

The transport of tape 5 with its "unities" $33^{1-n}$ is controlled by the lower part of the transport control mechanism (feeding control mechanism) 11. It consists, comparable to its upper part, of the transport lever 34 and the magnet coil 35. It can only feed the tape 5 from left to right in arrow-direction 19 by one "unity" 33, if the magnet coil 35 does not prevent the lever 34 from engaging one perforation hole.

The signal-head-system, which moves to and fro in arrow direction 18 and 19 includes two sets of fifteen parallel arranged signal heads $36^{1-15}$ and $37^{1-15}$ with their slots $39^{1-15}$ and coils $40^{1-15}$ and $41^{1-15}$, of which each head is co-ordinated to one of the rows $23^{0-9, a-e}$ (see Figs. 3 and 4). On the movement of the sliding-signal-head system 10 to the left hand side, in arrow direction 18, the magnetic signals within the different rows $23^{9-0, a-e}$ can be completely or selectively sensed and transferred via an amplifying system to other operating means.

The stepwise movement and the sensing and recording of signals on the stationary tape enables the use of all the many control possibilities which a stepwise feeding of punched card allows, without complicated intermediate storing systems.

The advantage of such a use of stepwisely moved magnetic tapes lies in the possibility of an easy recording and erasing, and a repeated sensing of signals in any selected signal position and sequence during e.g. one cycle, and very simple recording, erasing and feeding means, compared with punched card mechanism. Higher outputs can be achieved by simple means. The recording of signals on a tape can be achieved in different ways. Some principal ways are described in the following. The choice of the recording means depends on whether the recording is to be effected on tapes with magnetized synchronizing signals on them, for a greater signal capacity of the tape, or without them, whether it is to be combined with a digit sequence transposing mechanism or not, what sort of synchronizing marks are used, whether a stepwise tape-movement is or is not adapted to and/or controlled by a ten's keyboard system of e.g. a typewriting machine, a separate ten's keyboard, a full keyboard of e.g. a cash register etc., and during the pressing down of which key a signal can be effected.

Instead of the sensing and recording being done by the moving of signal heads over a stationary tape the reverse arrangement may be adopted, which has other advantages, including the advantage that the stationary signal heads give greater simplicity of construction.

Figs. 6–9 show a tape recording mechanism, adapted to be controlled by the keyboard "1" of the typewriting machine in Fig. 1 provided with a digit-sequence transposing mechanism, having means for the recording of synchronizing signals and adapted for stepwise tape feeding by the feeding-system 11 of Fig. 5. The parallel operating signal heads of Fig. 6 ($36^{9-0, a-e}$) corresponding to the heads $36^{1-15}$ of Fig. 5 of the signal head system 10 are moved to and fro in arrow-direction 18 and 19 below the tape 4, which is held in a fixed position during the signal-head movement in arrow-direction 18 by means of transportation holes 22 and mechanical registering teeth (30 of Fig. 5). The coils $40^{9-0, a-e}$ of the signal heads are connected at their one end 42 in parallel to the negative pole 43.

The other end of each of the coils $40^{9-0, a-e}$ is connected to one of the contacts $45^{9-0, a-e}$ actuated directly or indirectly as relay contacts by the keys of keyboard 1 Fig. 1 according to the coding scheme of for instance Fig. 4.

Fig. 6 shows for a better understanding of the principle, a simplified arrangement in which signals for characters or digit values are recorded successively in the sequence of the columns $24^{1-80}$, beginning at vertical column $24^1$ and ending at vertical column $24^{80}$ (Fig. 3), comparable to the successive punching of the columns of punched cards. The control circuit is provided with a selecting switch, shown in Fig. 7, comprising the rotatable disc 47 on shaft 46 and with projection 48, one pair of primary/secondary coils 49 and 50 on their iron core 51, and with a discharge tube 52 and a one-rotation-relay 53/54, allowing an effectiveness only for one rotation.

The core 51 of the pair of coils 49 and 50 is closed at its upper end and open at the lower end. The projection 48, for one time instant during each rotation of disc 47, closes the magnetic circuit from the primary to the secondary coil. If during this rotation the primary coil 49 is energized by a D.C. current, from the positive pole 44 via the closed contact 54 of the relay 53, a resistance 27 and the primary winding 49 to the negative pole 43, a voltage surge is induced within the secondary coil 50 when the magnetic circuit is completed by the projection 48 and the discharge tube 52 is ignited. If the signals are recorded as amplitude signals and the to-and-fro movement of the signal head system 10 is synchronized with the rotation of disc 47, in that during the movement of the signal head in arrow-direction 18 the said disc turns once, then the ignition of the discharge tube 52 effects a recording of a signal in a definite column of tape 4 and within that horizontal line of tape 4 the signal head of which is switched on by closure of one of the contacts 45.

The ignition of the discharge tube 52 causes the relay 53 to open the contact 54, thereby preventing further excitation of the primary winding 49.

Figs. 8 to $10^b$ show a different arrangement of the selecting switch described with reference to Figs. 6 and 7. It comprises the disc 47 with projection 48 and, for instance, eighty pairs of primary and secondary coils $49^{1-80}$ and $50^{1-80}$. This arrangement differs from the selecting switch already shown in Fig. 7, only in so far as, instead of one pair of primary and secondary coils 49 and 50, there are eighty pairs of such primary and secondary coils, $49^{1-80}$ and $50^{1-80}$, disposed in a circle around disc 47.

Likewise as in the means shown in Fig. 6 the arrangement of Fig. 8 comprises the shaft 46 which, by means of gears 55a, 55 with a ratio 2×1, drives the reciprocating signal head system 10 and the tape feeding system 11 (see Fig. 5).

Figure 11:
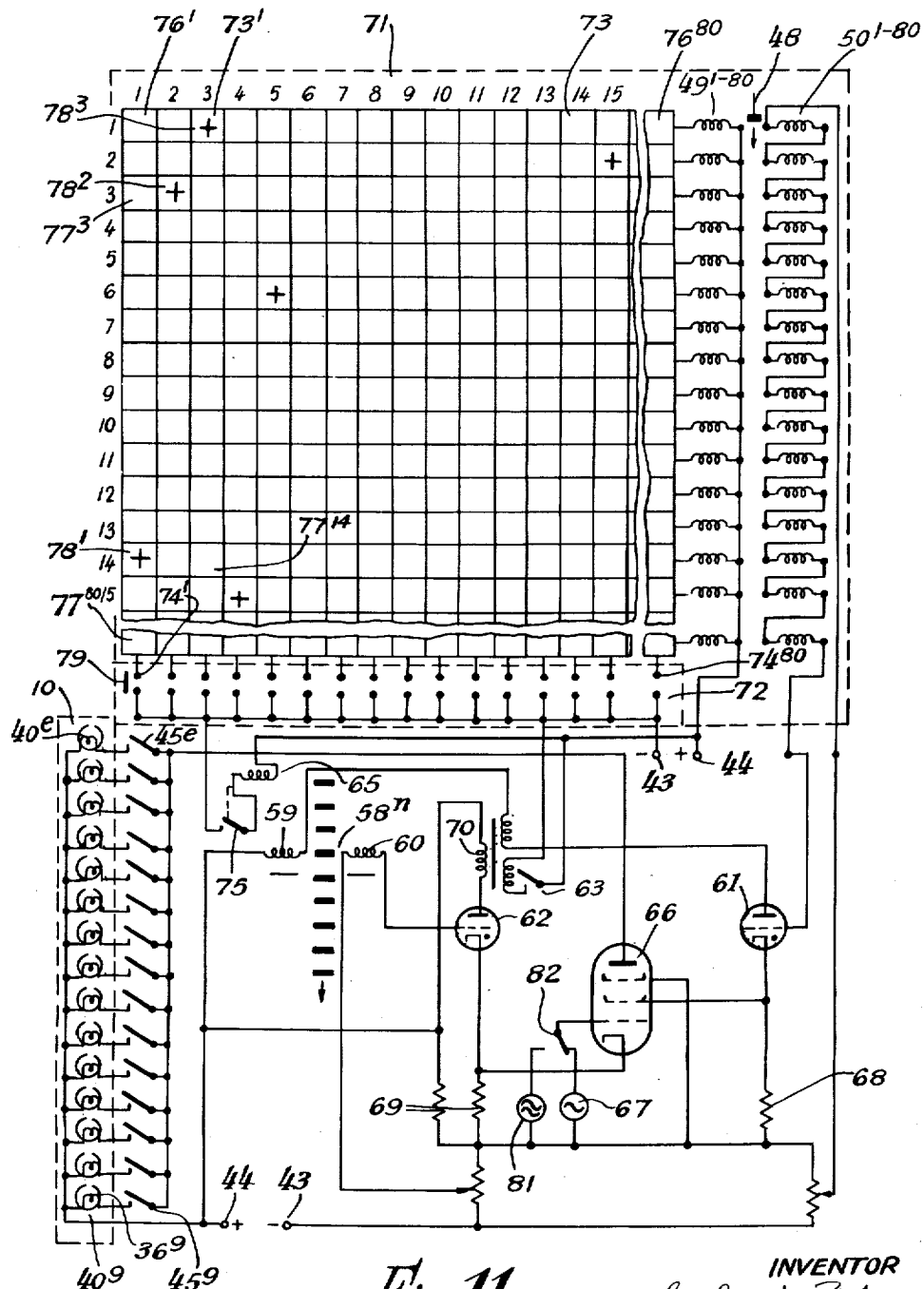
Fig. 11 shows diagrammatically a complete recording arrangement including means for changing the sequence of denominations in which the signals occur.

The shaft 46 is driven by a motor 56. On the shaft 46 is also mounted a second disk 57 which has on its circumference 80 teeth $58^{1-80}$ with an angular displacement relative to the projection 48 of the disk 47 of for instance 3 degrees, if the angular distance between adjacent teeth 58 of disk 57 is 3.6 degrees. The tooth 58 generates in the secondary coil 60 of the pair of coils 59 and 60 a surge which ignites the discharge tube 62 (Fig. 11) if the discharge tube 61 has been ignited previously, since the primary coil 59 is connected into the discharge circuit of discharge tube 61. Both discharge tubes 61, 62 are shown in Fig. 11.

Furthermore the switch 63 is operated by projection 48 once within each rotation of disk 47, to control the one-revolution-clutch 64, which has a control magnet system 65 (Fig. 8). Such clutch is driven by the motor 56 and allows one revolution of shaft 46 with gear 55a and disks 47 and 57 for each excitation of the control magnet 65.

Fig. 9 represents a single pair of coils 49 and 50 with its iron core 51, on an enlarged scale.

Figure 10A:
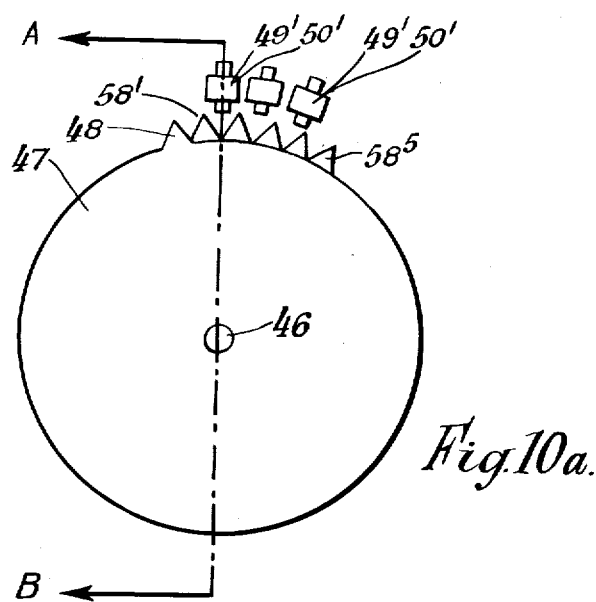
Figs. 10a and 10b are side view and cross-section respectively of a distributor.
Figure 10B:
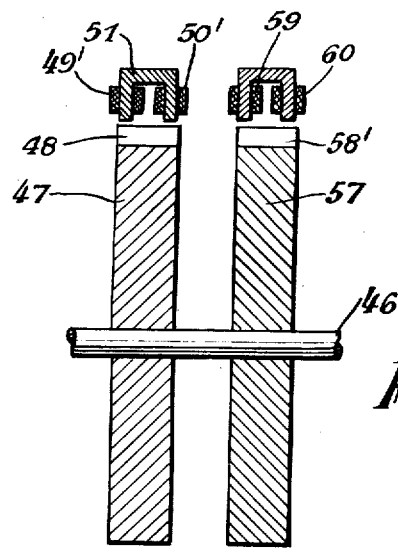

Figs. 10a and 10b show the two disks 47, 57 on shaft 46: disk 47 with one projection 48 and disk 57 with eighty teeth $58^{1-80}$, of which only teeth $58^{1-5}$ are represented. Fig. 10b shows a cross section through the two disks, along line A—B of Fig. 10a with primary coils $49^1$ and 59 and secondary coils $50^1$ and 60. There is to be seen in each of the pairs of coils the co-ordinated core, for instance core 51, which is closed at the upper end and open at the lower end.

Fig. 11 shows diagrammatically a complete recording arrangement. The relay contacts $45^{9-0,a-e}$ actuated by the keys of the keyboard 1 of Fig. 1 are connected with the coils $40^{9-0,a-e}$ of the signal head system 10, which is moved to-and-fro in the way explained with reference to Figs. 5–8. The other ends of the windings of the coils 40 are connected in parallel to the positive pole 44. The opposite ends of contacts $45^{9-0,a-e}$ are connected to the plate of pentode 66, the control grid of which receives a constant frequency signal, for instance a sinusoidal signal from signal generator 67.

The opening of pentode 66 is controlled by the two discharge tubes 61 and 62. The voltage drop across cathode resistance 68 of discharge tube 61 is applied as the screen grid voltage of pentode 66, if the discharge tube 61 is ignited. Hereby the pentode 66 is "opened" as it receives the essential screen grid voltage.

The voltage drop across resistance 69 which is generated by the current of the discharge tube 62 raises the voltage of the cathode of the pentode 66 sufficiently to cut it off. The control grid of the discharge tube 61 receives the required voltage surge for its ignition by the secondary coil system $50^{1-80}$. The discharge tube 62 receives the required voltage surge for its control grid by the secondary coil 60 shortly after the discharge tube 61 has been ignited, as its primary coil 59 is connected into the main circuit of discharge tube 61. So the next passing tooth $58^n$ after the ignition of discharge tube 61 will ignite discharge tube 62. Therefore, the pentode 66 will be open only for a short time, i.e. from the time instant of the ignition of discharge tube 61 to the time instant of the ignition of discharge tube 62. Only during this time, can signals generated by the signal generator 67, be transferred to that one of the signal head windings $40^{9-e}$ which corresponds to the closed digit value switch $45^{9-0}$ and supplemental line contact $45^{a-e}$. It is evident that the signal head which is switched on will select the line for signal recording. It is further evident that the transverse column $24^{1-80}$ of Fig. 3, into which the signal will be recorded depends on which of the primary coils $49^{1-80}$ is excited during the one rotation of disk 47.

The extinction of the two discharge tubes 61, 62 after a complete revolution of shaft 46 with disks 47 and 57 will be effected by switch 63, in the way of generating a voltage surge within the secondary windings of transformer 70 which depresses the plate voltage of the tubes below their discharge maintaining voltage.

If instead of recording signals as e.g. intermittently-generated frequencies, interruptions of a continuous frequency are to be used as signals, a second generator 81 is required. In this case, a first constant frequency is recorded by all parallel signal heads in all the horizontal lines during the first movement. Afterwards, i.e. for instance during the next 80 key depressions, the signal generator 81 with a higher, erasing frequency is switched on via switch 82, so that at the selected cross points of vertical columns and horizontal rows, signals are recorded by erasing the constant modulation.

The co-ordinating for a selective changing of the sequence of the signal recording depends on the co-ordinating switching means 71. It consists of a stepping or distributing switch 72, the cross-switching board 73 and the primary coils $49^{1-80}$. The switching board 73 is vertically connected to eighty parallel contacts $74^{1-80}$ of the stepping switch 72, and is horizontally connected to the parallel ends of the primary coils $49^{1-80}$. The opposite ends of the stepping switch contacts $74^{1-80}$ are connected in parallel to a pole 43 of the battery and the opposite ends of the primary coils $49^{1-80}$ are connected in parallel to the other pole 44 of the battery.

At each pressing down of a key of the keyboard the corresponding keyboard contact $45^{a-e}$ is closed and the stepping switch 72 is actuated by one step by its winding 65 being energized by an additionally closed contact 75, so that at each pressing down of a key, the contact $74^{1-80}$ for the next denomination will be closed by the stepping switch.

The vertical rows $76^{1-80}$ within switching board 73 are connected to the horizontal rows $77^{1-80}$ of the switching board by plugs $78^{1-80}$. Within each vertical row which is to be actuated, one plug is provided, connecting this vertical row with one of the horizontal rows. For instance, vertical row $76^1$ is connected via plug $78^1$ with horizontal row $77^{14}$, vertical row $76^2$ via plug $78^2$ to horizontal row $77^3$, vertical row $76^3$ via plug $78^3$ to the horizontal row $77^1$ and so on.

Consequently, with the first pressed down key, signals will be recorded within the switched-on line only within the column $24^{14}$ of tape 4 (see Fig. 3), with which the battery pole 43 is connected via the moving contact 79 of the stepping switch 72 and contact $74^1$, to vertical row $76^1$ of the crossing switch board 73, then via plug $78^1$ to horizontal row $77^{14}$, to primary coil $49^{14}$, and back to the pole 44 of the battery. Therefore a voltage surge will be generated within the secondary coil system $50^{1-80}$ only at the time instant, when the tooth 48 passes between the pair of coils $49^{14}$ and $50^{14}$. By this voltage surge, generated in secondary coil $50^{14}$, the discharge tube 61 is ignited at this instant, and the pentode 66 is opened in the way described above.

Shortly afterwards, i.e. before projection 48 passes between the next pair of coils $49/50^{15}$, the discharge tube 62 is ignited by a voltage surge in secondary coil 60 in the described way, and the pentode 66 is closed. By this means only in that time period in which the slots of the signal head system 10 pass over the imaginary column $24^{14}$ of the tape 4 can the signal of the signal generator be recorded by the signal head system, via its coils $40^{9-0,a-e}$ and pentode 66. As on the pressing down of key "3" only contact $45^3$ would be operated, the signals could be only recorded within the column $24^{14}$ in horizontal line $23^3$.

At the next position of the moving contact 79 of the stepping switch 72, that is to say when the next key is pressed down, signals will be recorded within the column $24^3$ of tape 4 as plug $78^2$ connects the vertical row $76^2$ with the horizontal row $77^3$. At the third operation, the third vertical row $76^3$ is effective in which plug $78^3$ effects that signals will be recorded within the switched horizontal lines only in a column $24^1$ of the tape, and so on. Alternatively the signals in each case may first be recorded in an intermediate storage as described below, for example on a rotating drum or disk, from which they are re-transferred to the tape. In this arrangement the signal heads for the tape may remain stationary over a moving tape, with an equivalent effect. This is explained more fully in connection with Fig. 15.

The rotation of shaft 46 with the discs 47 and 57 can be effected in such a way that the one rotation relay arrests the rotations of shaft 46 one by one in dependence on an actuation of the keys by means of a usual electromechanically operated one-rotation stop clutch (see 64 of Fig. 8), as used for instance in teletypers.

It is evident that start-signals can be recorded on the tape at the end of each column $24^1$ in each unity, when the first primary coil $49^1$ of the pair of coils is connected continuously to the poles of the battery without intermediate switching.

Groups of signals can also be grouped together by one starting signal, if certain primary coils, for instance every 10th, every 25th coil or the like, effect a continuous recording.

It is evident that by this means signals can be recorded on to the tape in any desired sequence, not withstanding the sequence in which the characters, digit values and commands will be fed in by pressed down keys of the keyboard. It is therefore no more necessary that the forms used in book-keeping or in factory administration, and the like must have their different sections in the same order as is required for the recording of marks in the sequence of the transverse rows, as it is required in punched card systems, where the difficulty of adjusting mechanical punches with economical means does not allow of the altering of the sequence of marks when recording.

Figure 12:
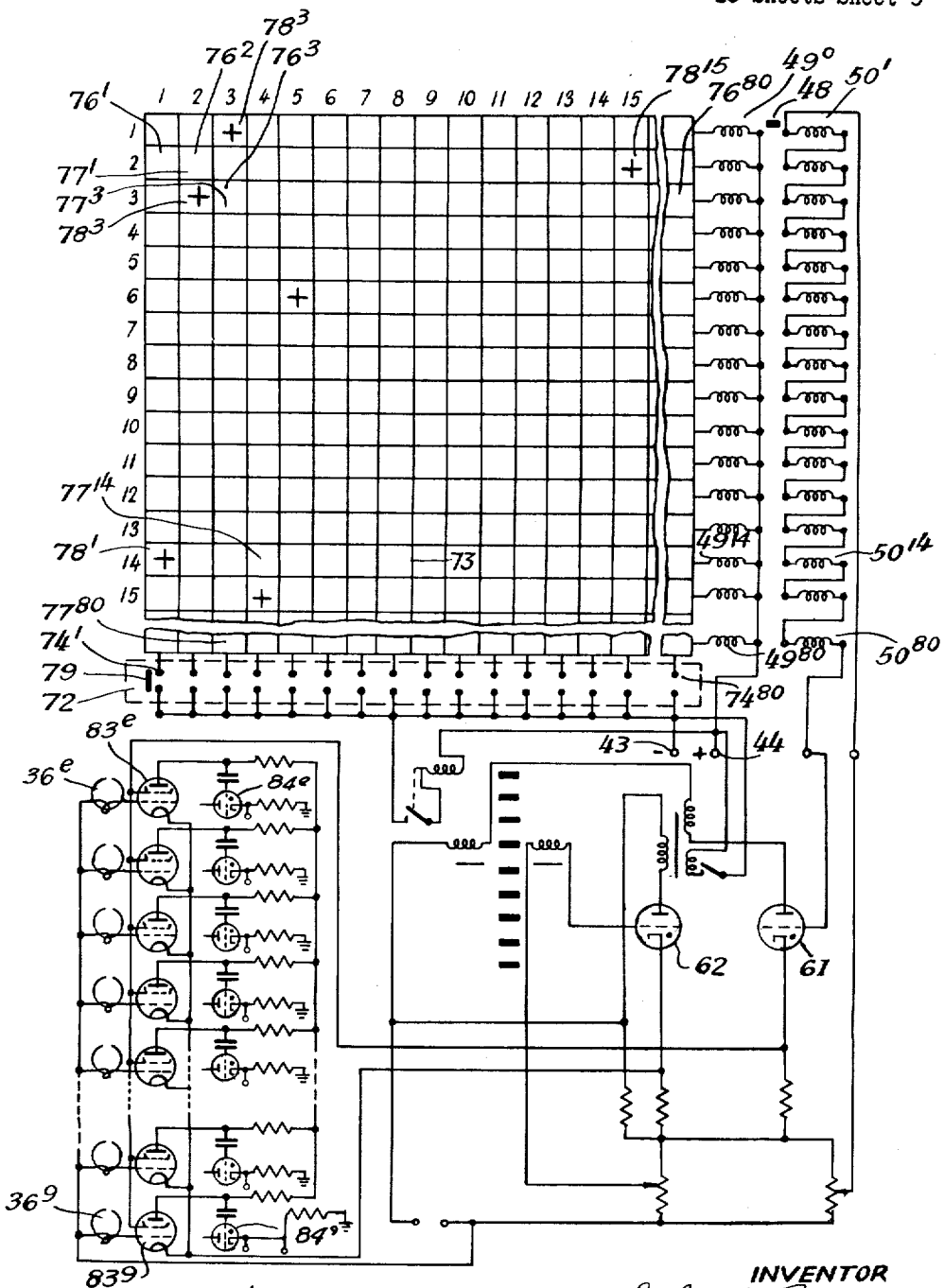
Fig. 12 is a similar view to Fig. 11 but showing a modified arrangement.

Fig. 12 shows the selective and denomination-wise coordinated sensing of unities of the tape produced when the recording arrangement of Figs. 3–11 is used. The selecting means, signal heads and tape feeding means are the same as described above. By the use of the same reference numbers for corresponding parts in the different figures further explanations are necessary only with regard to the sensing. Each of the signal heads $36^{9-0, a-e}$ has a separate amplifier tube (respectively $83^{9-0, a-e}$), the screen and suppressor grid voltages of which are controlled by the two discharge tubes 61 and 62 respectively as described with reference to Fig. 11. Each amplifier $83^{9-0, a-e}$ is connected to a relay, preferably an electronic relay, e.g. discharge tubes $84^{9-0, a-e}$, which controls further operations in dependence on the sensed signals.

In the preceding description it has already been shown that the movement of the control means of Figs. 5–11 can be effected stepwisely, cycle by cycle (i.e. for instance rotation by rotation). The relay 65, which controls the one cycle operation of the mechanism can release the one-rotation stop-clutch 64 (Figs. 8 and 11) for only one cycle each time. At lower speeds speed-synchronizing by means of start-stop-devices according to teletyping means, as shown in Figs. 13a–c can be used. Hereby the control of column by column processes can be effected. The start-stop-devices can be used as well for the recording, sensing and erasing of signals on tapes, as for the same processes in connection with magnetizable strips or the like on letters, book-keeping bills, ledger sheets and the like. The magnetizable material can be either originally within the structure of the paper or the like material of the tape or other carrier or applied to it later. By a recording coil, moving relatively to the magnetizable layer, retyping and teletyping systems can be produced, if an amplifier, start-stop-distributor and coding-relays are used. Magnetized tapes or strips and the like on paper, card and the like, can be sensed at another office from that where recording took place, and be transferred there into the required printed copies, into interval slips, tapes, punched cards or the like for book-keeping, cost accounting etc. in such other office. If arrangements are standardized, even further simplifications can be achieved by using the sheets, letters or the like as transfer means for automatic computing, storing, sorting procedures etc.

A further use can be made of such markings on the sheets, cards or the like on the printing of ledger accounts. In this case, for example, the number of the ledger account can be examined in order to state, whether the required ledger account is introduced into the input ways of the printing device or not.

If the ledger account printer 13 in Fig. 2 is used, in co-operation with an automatic feeder such as 12—17 in Fig. 2, the numbers of the ledger accounts can be examined automatically in comparison with the required figures of the ledger accounts, so that only those accounts are prepared for being printed which have the desired number, whereas the others pass through, without being printed at all.

Additionally, the position of the new printing line, onto which the printing has to be effected, can be recorded likewise on each and later on sensed and erased for a new record. For greater outputs self-synchronizing signals for synchronizing saw-toothed discharge circuits can be used in combination with electronic distributing switches, preferably a cathode ray tube. The synchronizing signals effect then a synchronized movement of the cathode ray beam over switching electrodes (see Figs. 18 and 19).

Fig. 13c shows a portion of a sheet of paper, e.g. a ledger account 80 provided with a magnetizable strip, in the tracks of which are arranged starting signals 85 and digit value signals $86^1$ and $86^2$. Said signals are generated by a timing generator and interrupted according to switch-on or off contacts of a start-stop contact distributor.

The reversed process, i.e. the sensing of such signals and distributing them according to their position relatively to a starting signal is shown by the Figs. 13a and 13b, in which Fig. 13a shows the mechanical start-stop distributor and Fig. 13b shows the required sensing and amplifying means.

Fig. 13a comprises the starting magnet 65 with its armature normally blocking the lever 91 fixed on the shaft 93 driven frictionally by a motor (not shown). On the said shaft are different cam discs 94 and $95^{1-6}$ of which, in the blocked position, the contact 90° is closed by the cam of its disc 94 in a way known from start-stop teleprinters. As soon as the signal sensed e.g. as a magnetic signal by sensing head 25 is amplified by pentode 87 and energizes the winding of relay 88, its contact 89 closes a D.C. way from 44 to 43, and this starting signal excites the starting magnet 65 via distributor contact $90^0$. The armature of the magnet 65 is now lifted and allows the actuation of the blocked lever 91 according to the friction drive of shaft 93. In consequence of this starting of the distributor $95^{1-6}$ the following signals 86 etc., sensed by signal head 25 are amplified via pentode 87 energizing the winding of relay 88 and effecting a corresponding actuation of its contact 89. Hereby the D.C. circuit 43—44 is connected via those conductors $96^{1-6}$ which correspond in their timed position of closing to the timed position of the magnetic signals 85, 86 etc. of Fig. 13c. The distributing of the sensed signals to the different circuits allows of the controlling of switching means in dependence on digits, commands or characters which are represented by the sequence of magnetic signals 86, following after the starting signal 85.

Fig. 14b shows signals on the tape 4 in that in track 104 zero signals 105 are recorded within each denomination area and in another track digit value signals $106^{1-n}$ are recorded, in a position corresponding e.g. to the recorded digit value, e.g. $106^1=5$, $106^2=3$, etc.

If instead of zero marks, terminating signals 108 of track 107 are used as timing marks for recording and sensing, the digit value signals 106 receive a complementary meaning.

By the zero marks 105 the discharge tube 103 of Fig. 14a is ignited, via sensing head 98 and amplifier 101, as a starting signal for time measurement, of such digit value signals, by e.g. an electronic distributor.

If by this zero mark 105 used as a time base signal the linewise movement of a cathode ray is released with a definite speed, the digit values or the like allow a distribution to different ways in similar manner but with electronic means, as has been described for mechanical start-stop means with reference to Figs. 13a and 13b.

The linewise operating cathode ray distributor can be provided either with a series of parallel operating photocells, of which only those are actuated which correspond as to their time value relatively to their time base to the timed position of the sensed signals, or there may be secondary emitting fields provided on the screen of the cathode ray tube, or otherwise there may be plates which come in direct contact with the cathode ray.

The digit value signals 106 are sensed by signal head 97 and amplified by pentode 102. The output of this pentode controls the intensity of the cathode ray distributor not shown in Figs. 14a and 14b. At the moment of sensing the signal 106, the cathode ray is intensified thus selecting the photo-cell, or the secondary emitting field or otherwise the plate which is coordinated to the timing instant of the digit value signal.

The device according to Figs. 14a and 14b is comparable to the start-stop device of Figs. 13a, 13b and 13c. Instead of the start signal, the zero signal is sensed and the signals of the combination 86 correspond to the digit value signal 106.

If complementary digit values are required, e.g. in subtraction processes, the actuation of switch 100 effects a connection of the signal head 97 with the control grid of pentode 101, and of signal head 99 to the control grid of pentode 102. By this means the digit value signals 106 are used as signals, initiating the movement of the cathode ray, and the terminating signals 108 of track 107 effect the selecting of the photo cells, fields or plates co-ordinated to the complementary digit value of signals 106.

Figure 15:
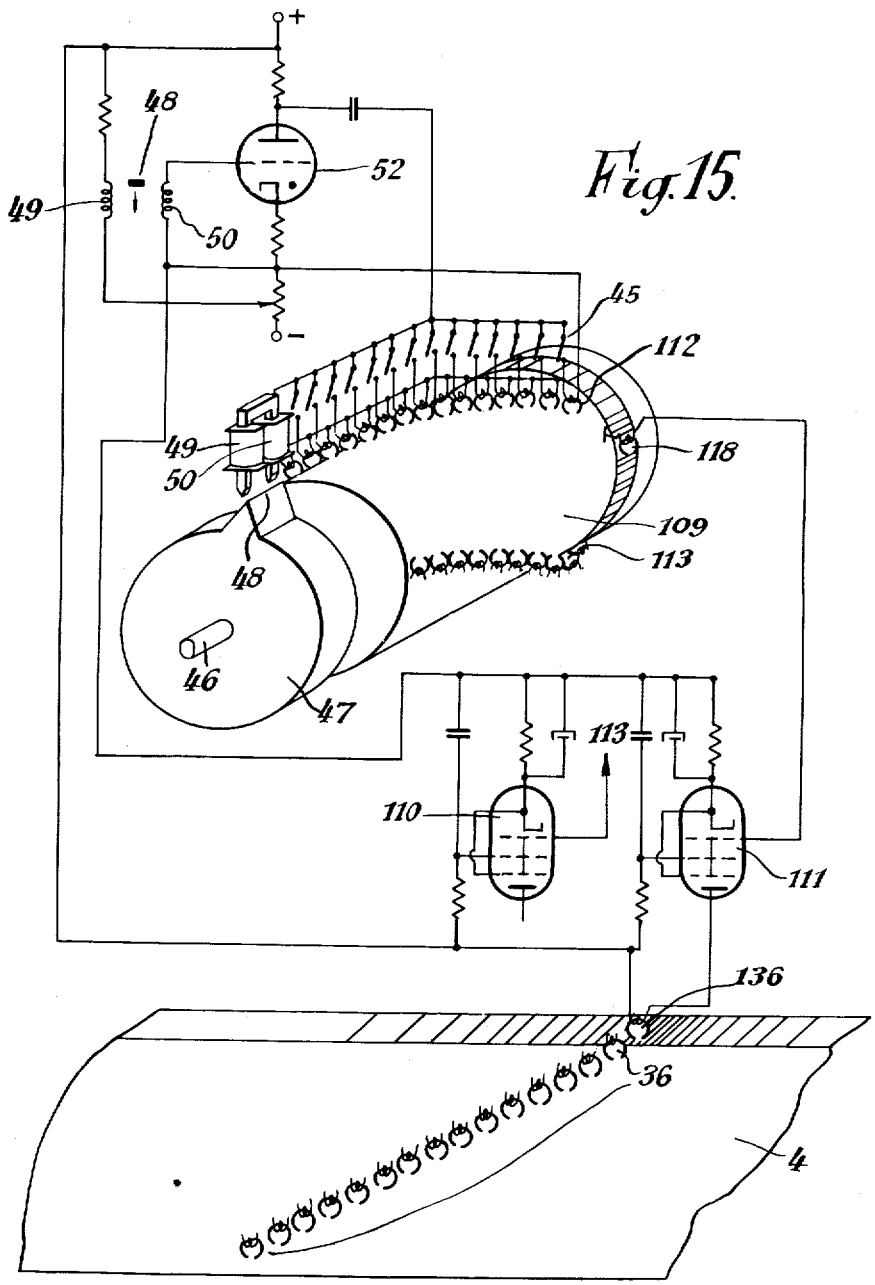
Fig. 15 illustrates the use of an intermediate storage means between the initial input of signals and their recording on the tape.

Fig. 15 shows a recording device in which the signals are recorded at first on a magnetizable drum, disc or the like. The recording heads $112^{0-9,a-e}$ connected with the keys $45^{0-9,a-e}$ of the keyboard, correspond to the recording heads 36 of Fig. 6 in their function. The coils 49 and 50 and discharge tube 52 are the same as shown in Fig. 6. The transfer of signals and of control frequencies from the drum 109 to the tape 4 is effected only when all the required signals are recorded on said drum. The recording on this drum is effected by means of the key contacts 45 in co-operation with the inductive switch 48—52.

The signals are sensed by sensing heads 113 and transferred via signal heads 36 and pentode 110 to the tape 4, whereas the control frequency is sensed by signal head 118 and transferred via pentode 111 and signal head 136 to the synchronization track of the said tape.

Figure 16:
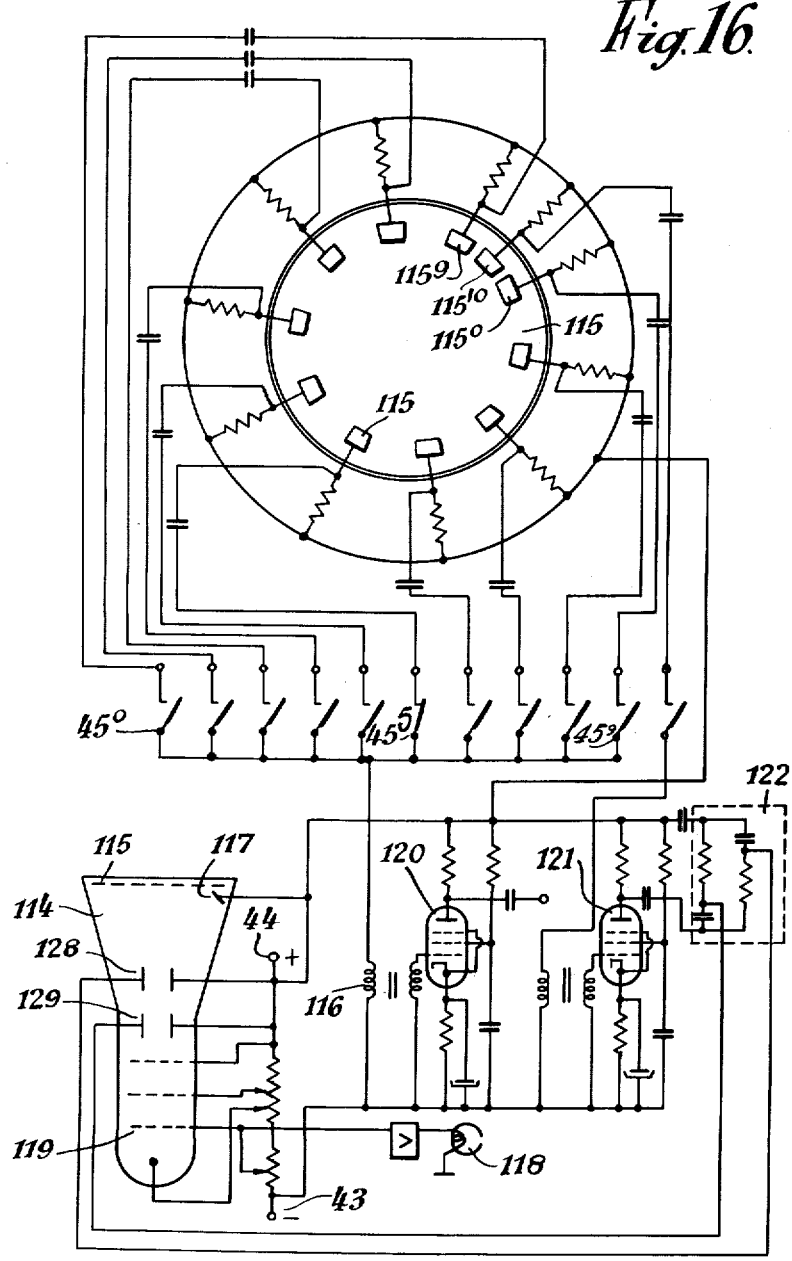
Figs. 16–19 illustrate the use of electronic distributors for synchronizing the signals.
Figure 17:
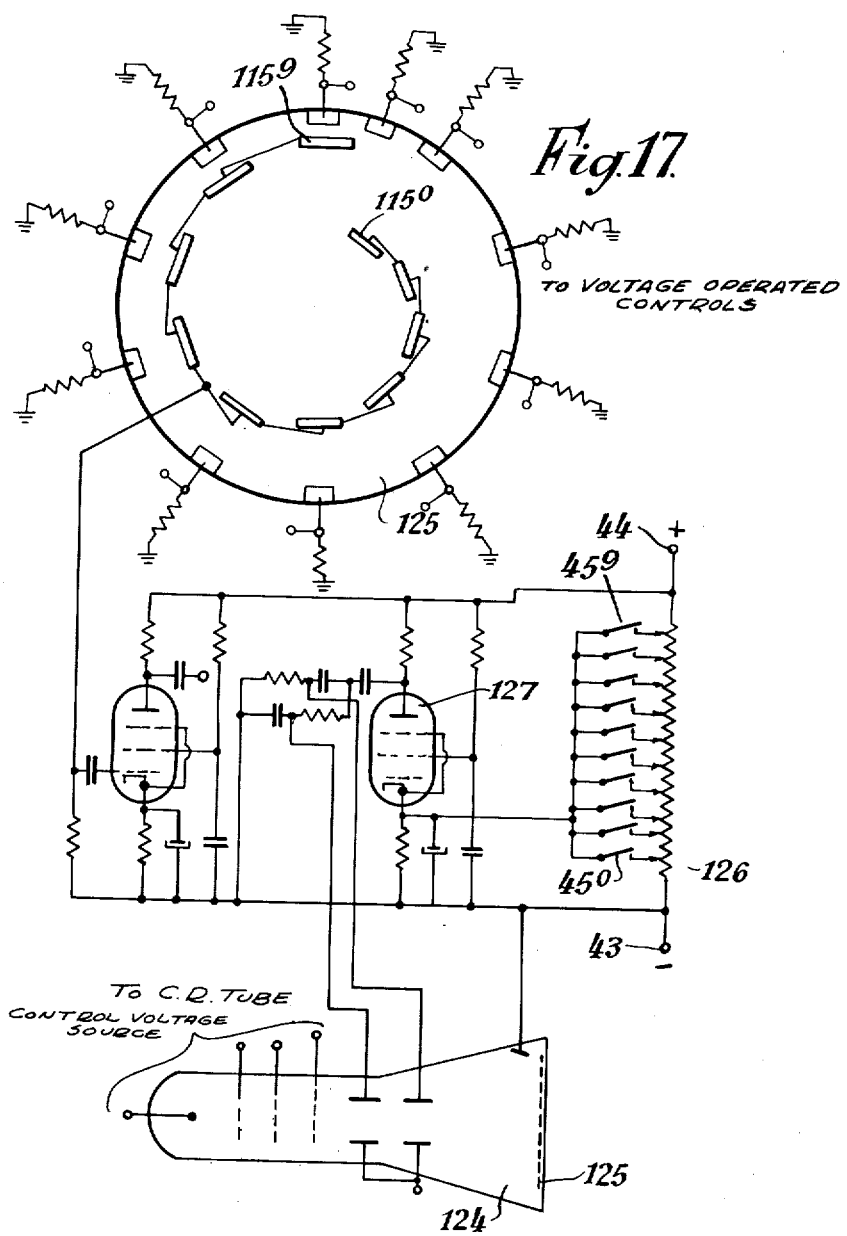
Figure 18:
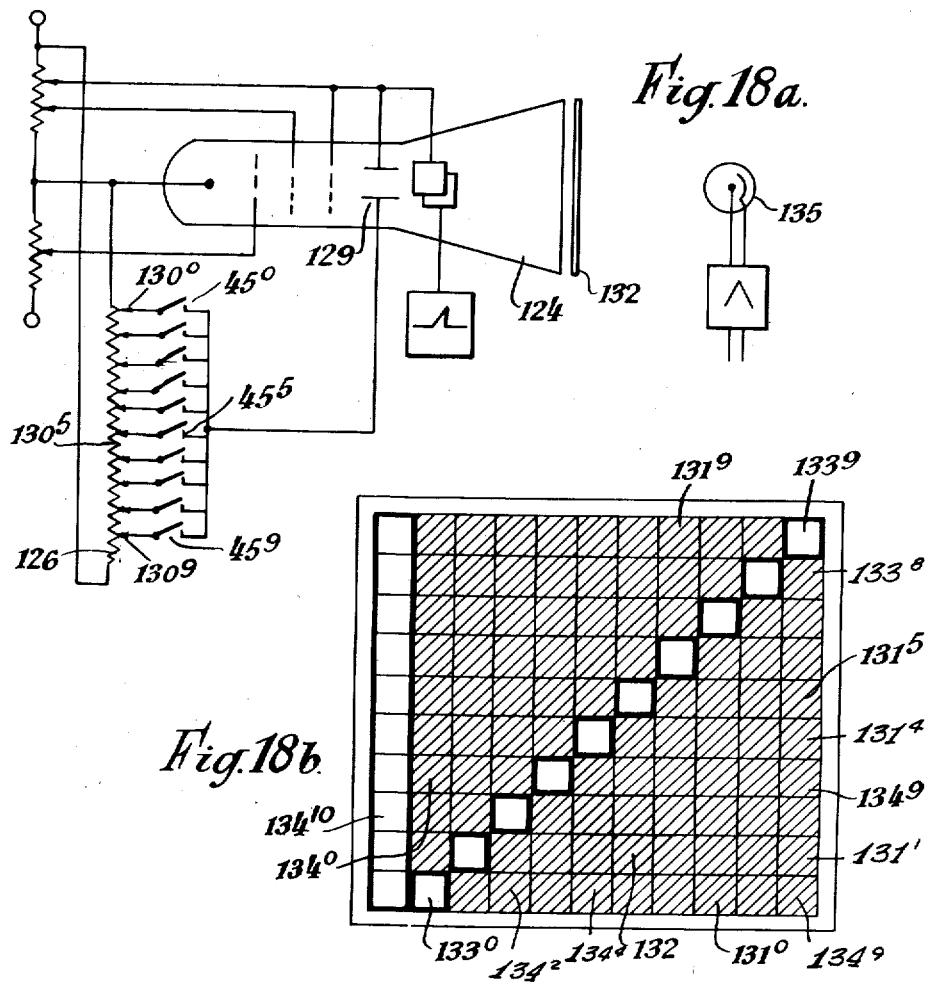

Figs. 16, 17 and 18 show the generation of co-ordinated, timed displaced signals in dependence on switches or voltages which indicate the digit value.

The use of a keyboard in connection with the cathode ray distributor is shown in Fig. 16 wherein a cathode ray tube serves as signal distributor for the recording of signals in dependence on switched-on contacts actuated by the keyboard.

The cathode ray distributor 114 is comparable to any other cathode ray tube in general. It comprises a cathode, control grid 119, and two pairs of deflecting plate systems 128 and 129. Additionally the cathode ray tube is fitted with a layer 115 divided into different sectors on its screen.

The advantages of this electronic distributor are the simple control, for the synchronization to a control frequency, so that e.g. several distributors can be controlled by the same frequency or by synchronizing signals on a tape and so on.

The cathode ray tube 114 of this example has co-ordinated fields $115^{0-9}$ and $115^{10}$ which are arranged in a circle and are active in dependence on the effectiveness of the rotating cathode ray of this tube. These fields are situated inside the tube as anodes for direct cathode ray switching, or as secondary emitting spots for indirect cathode ray switching. Otherwise they can be replaced by small photo-cells arranged outside of the tube, in front of the fluorescent screen.

The cathode ray signal distributor is one of the type in which the circular fields (spots) $115^{0-9,10}$ of the screen emit secondary electrons, when hit by a cathode ray of sufficient intensity. Each of the fields is connected via a coupling condenser to the one pole of the switches $45^{0-10}$, the other poles of which are connected in parallel via the primary winding of the transformer 116 to the battery pole 43. The other pole 44 of the battery is connected to plate 117.

The control grid 119 of the cathode ray tube 114 receives a certain control frequency from a signal generator, e.g. a signal head 118. Only one of the switches $45^{0-10}$, for instance switch $45^5$, is shown as switched on. When the cathode ray is tracing along the fields associated with the open switches $45^{0-4}$, the control frequency of signal generator 118 cannot be effective in the primary coil of transformer 116. But when the cathode ray is tracing along the field $115^5$ of closed switch $45^5$, the frequency controlling the intensity of the cathode ray is amplified by the tube 114 and would become effective within the transformer 116.

The primary winding of said signal transformer is excited by the control frequency of signal generator 118 via the control grid 119 of the cathode ray tube 114 only during that period in which the cathode ray touches field $115^5$. This timed control frequency, obtained from the field made effective by its switch is transformed by transformer 116 and is amplified by pentode 120. The field $115^{10}$ delivers a control signal at the beginning of each rotation of the cathode ray, synchronizing a generator 121 for the circular deflection voltage for the circular movement of the cathode ray, effected e.g. by two control frequencies with a relative phase difference of 90°, produced by phase shifting means 122 from a transformed or recorded control frequency.

Fig. 17 shows the possibility of effecting impulses corresponding e.g. to different digit values in dependence on co-ordinated voltages during circular deflection. On its screen 125 the cathode ray tube 124 has sectors 115 arranged in a spiral. According to the different biasses tapped by switches $45^{0-9}$ at the voltage divider 126, the pentode 127 gets various amplification factors, as its characteristic is changing in dependence on its bias. By means of this arrangement of e.g. secondary emission lines the amount of the deflection voltage can be changed over into timed signals with recording in a comparable way to that illustrated in Figs. 15 and 16.

Fig. 18a shows a cathode ray tube with linewise deflection of the cathode ray and a fluorescent screen.

The contacts $45^{0-9}$, actuated by the keys of the keyboard (Figs. 1 and 2) are each connected at one side to the respective tappings $130^{0-9}$ of a voltage divider 126. In dependence on the actuated contact $45^{0-9}$ the vertical deflection plates 129 of the tube receive another deflection voltage, deflecting the cathode ray by a corresponding angle to one of the horizontal lines $131^{0-9}$ (Fig. 18b). If for instance contact $45^5$ of the key of digit value "5" is actuated the tapping $130^5$ of voltage divider 126 becomes effective and the cathode ray is vertically deflected to the horizontal line $131^5$.

Before the fluorescent screen of cathode ray tube 124 is a black mask 132 with small openings $133^{0-9}$ being distant from each other by one horizontal line and one vertical row of the screen. A cathode ray which starts one horizontal movement from left to right in the time instant $t_0$, and terminates it in the time instant $t_{11}$ will, in time instant $t_1$, be in the vertical row $134^0$, in the time instant $t_6$ in the vertical row $134^5$ and in the time instant $t_{10}$ in the vertical row $134^9$.

If the cathode ray is vertically deflected to horizontal line $131^5$ because of the switched-on tapping $130^5$, the fluorescent point will be behind the small opening $133^5$ of the mask in time period $t_6$. The photo cell 135 will emit a photo current at this time period $t_6$ being at a time distance of 5 periods from the starting signal for the horizontal movement.

The amplification and recording of the signals take place in the usual ways. The effect remains the same, if instead of utilizing a photo effect, use is made of the cathode ray's hitting a secondary emitting spot on a screen within the tube, or the field of a correspondingly arranged plate.

Figure 19:
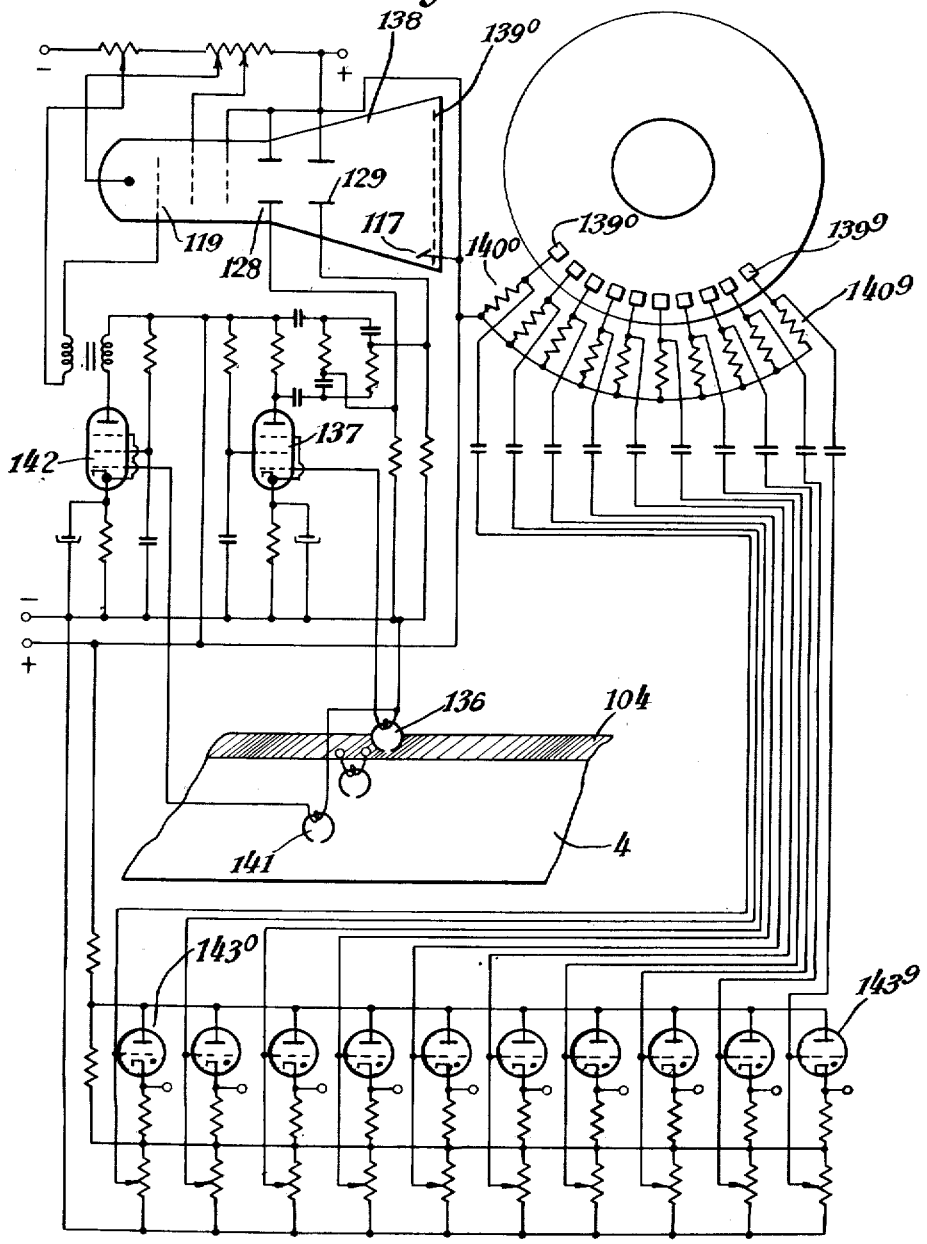

Fig. 19 shows electronic distributing means for the distributing of sensed signals to different switching circuits. Said electronic distributing means comprise a cathode ray switch with circular deflection, alternatively horizontal deflection can be provided. Both means differ only in the deflection way and the arrangement of the switching fields. In the other parts, the switching diagram is the same.

Referring to Fig. 19 signal head 136 senses a synchronization signal of tape 4 track 104 and supplies the sensed synchronization frequency to the control grid of pentode 137.

The amplified control frequency, if a saw tooth frequency effects horizontal linewise deflections or, if a sinusoidal control-frequency, as shown in Fig. 19, effects a circular deflection of the cathode ray. The control frequency is transferred to the deflecting plates 129 of the tube and shifted by 90° relatively to the deflecting plates 128, so that the cathode ray rotates in definite position to the phase of the control frequency. As a modification, instead of artificially shifting the phase, two separate control frequencies, off-set by 90°, could be recorded. By this means the distributor is independent of any mechanical part, and can easily be synchronized by sensing previously recorded signals, or by transmitted signals. The sectors $139^{0-9}$ of the sensitive screen will emit secondary electrons, when hit by a cathode ray of sufficient intensity. The intensity is controlled by grid 119 of the cathode ray tube 138. Plate 117 is connected to the secondary emitting sectors 139 via high ohmic resistances $140^{0-9}$ effecting a voltage drop, if secondary electrons are emitted, i.e. if the bias of control grid 119 has become less negative, when a signal is sensed by signal head 141 and is amplified by pentode 142.

This voltage drop is supplied to the control grid of the co-ordinated discharge tube 143 and ignites it. After the ignition of one tube, the others will be blocked, if the resistances are of the correct value, and only that one of the switching circuit is actuated which corresponds to the timing position of the sensed signal. The extinction of the discharge tubes is effected at an exact time instant, e.g. by means of a negative impulse to the control grid of a pentode (not shown), cutting off the plate circuit of said pentode and the circuit of the discharge tubes 143.

If for instance signal transfer is to be effected from a continuously running tape to signal carriers having a movement relative to conveying means, e.g. to-and-fro moving signal head systems of tapes, magnetizable rotating discs, or to cathode ray movement over a cathode ray tube screen, etc. for storing, computing, sorting or the like, the reliability of the transfer is absolutely independent of mechanical tolerances or clearances. Every wanted connection between relay tubes $143^{0-9}$ and any controlled elements of an office machine can be effected so that, over a plug switch board or the like every desired column transposition is obtained for the introduction of signals into computers, printing devices or the like (see Figs. 11 and 12) which are equally applicable to columnwise re-arrangement in co-operation with intermediate storages preferably in the form of magnetizable cyclically operating drums, discs or the like.

Fig. 20a shows by means of a switching diagram the control of electronic relay tubes in dependence on information signals contained in one track 152 of a record means, for example a magnetizable tape. Synchronizing signals are contained in synchronizing track 151. Such synchronizing track may be preferably a second magnetizable track on such tape or constant optical synchronizing marks or the like.

In the arrangement of Fig. 20a is shown a magnetizable tape having one information track 152 sensed or recorded in dependence on signal head 154 and a magnetizable synchronizing track 151 in which the signals are sensed or recorded by means of signal head 153. The arrangement is shown operative for sensing. The synchronizing track 151 contains magnetized areas the beginning of which may be indicated by a start signal 155 and the ending of such unity of an area may likewise be indicated by a stop signal (not shown), which would be situated at the right hand side of the tape shown in this figure.

Such synchronizing signals for start and stop may be used in the way of start and stop signals in teleprinting systems. The start signal may be either the interruption of a constant recording of a frequency or an amplitude modulated signal or the like of a distinguished amplitude differing from the following signals for the synchronization.

The arrangement according to Fig. 20a is to show as an example the recording of signals on a tape being comparable as to its effect to a punched card. Each unity of the tape beginning at start signal 155 on the left side and ending at the not shown stop signal on the right side is to contain all the signals of a punched card e.g. an eighty column punched card. Further on the arrangement is shown in such a way that a linewise operation in which comparably to the sensing of punched cards in tabulating machines there are at first sensed all the columns within one horizontal digit value row, e.g. a punched card, digit value row "9." After the sensing of all the columns of the horizontal digit value row "9" follows the sensing of all the columns within the horizontal digit value row "8," then follows horizontal row "7" and so on, when the punched card would be moved further below sensing brushes. To demonstrate a comparable effect and the operation between information signals and synchronizing signals there is shown in Fig. 20a within the area $156^{1-n}$ an arrangement of synchronizing signals for each one column and wherein the whole group of columns $156^{1-n}$ corresponds to the line "9" of a punched card. Instead of holes which would be used at punched cards information signals 157 in the information track of the tape are co-ordinated to that synchronizing signals $156^{1-n}$ which correspond to the column in which a hole would be punched in a punched card. In Fig. 20a such information signals 157 are contained within the column $156^2$, $156^9$, $156^{11}$ etc. of track indicating that a "9" is to be computed, printed and so on within the columns 2, 9, 11 and so on as the sub-area of the unity of the tape synchronized by synchronizing signals $156^{1-n}$ would be comparable to the lowest horizontal row of a punched card "9."

After a space 177 in which no information signals will be recorded and which corresponds to the moving on of a punched card from one horizontal row to the following horizontal row, e.g. the horizontal row "8" of a punched card, the synchronizing signal area $158^{1-n}$ is to control the local or timed position of information signals within track 152 adopted to represent an "8" in all those columns, wherein signals within this row have a defined position to the respective synchronizing marks.

The length of such a tape unity, which corresponds with its two tracks to the marking of signals in a punched card, may be eight inches, so that each sub-area $156^{1-n}$, $158^{1-n}$ and so on will have a length of three quarters of an inch in those cases, if an arrangement of 12 horizontal lines of a punched card is to be represented in a lengthwise arrangement of a magnetizable tape. The whole unity of that tape may therefore contain about 10,000 wave lengths or pulses if the usual subdividing used at sound frequency will be used for recording. In order to secure an interference-free reproduction there may be used a recording of a number of wave lengths for instance ten wave lengths or pulses to represent one information signal 157 and the like. As a punched card of 80 columns has within 12 horizontal rows only the possibility to represent 960 different markings, the same effect may be obtained by a magnetizable tape with two tracks each track having a width of about $\frac{1}{10}$ to $\frac{1}{20}$ of an inch and a length of 8 inches, if ten wavelengths are used for indicating one signal. Freedom from spurious interference may be obtained by using only the integral of a plurality of wave lengths or pulses as indication for a mark instead of single wave lengths or single pulses. There is further on to be provided a stepwise control of the transport means of such tape so that it may be used in the same way as described in my co-pending application No. 498,048 filed March 30, 1955, for control-, sorting-, duplicating-tasks and so on for printers, computers, sorters, parallel punchers, and so on. It is a special feature of this invention that by the use of synchronizing signals co-ordinated to indicate the timed or local position of information signals for columns of digit values, a stepwise transport of such tape may be effected without losing the advantage of using synchronizing signals. The further advantage is the easy duplicating possibility for control-, duplicating-, sorting, selecting tasks and so on, as only two tracks have to be sensed and transferred. Further on there is only very little space required which may not be more than a small elongated track of a magnetizable layer of about the width of $\frac{1}{10}$ of an inch and the length of 8 inches on sheets, record cards or the like to represent all the signals of punched or other index points cards.

The operation of the sensing arrangement is shown in Fig. 20a with electronic distributing means being controlled by the signals in the synchronizing track 151. The sensing head 153 for synchronizing signals is operative together with the control grid of pentode 163 which will deliver current pulses when opened by signals sensed from the synchronizing track 151 via an intermediate amplifier tube not shown. The capacitor 164 receives therefore pulses charging it and deflecting a cathode ray from position $160^1$ to $160^n$ on screen 159 from position to position. There may be an eightyfold electronic switch or there may be used a tenfold electronic switch used repeatedly eight times within eighty columns, if group switching means are used being operative in dependence on the passage of the beam over each tenth group field. The discharge tube 165 is to discharge the capacitor 164 after each cycle of deflection.

Instead of the described electronic control switch other electronic switching means delivering or opening different switching ways may be used in dependence on the supplied synchronizing signals. In this case discharge relays $162^1$ to $162^n$ e.g. 80 discharge relays are to be controlled by the information signals within track 152. At the passing of the information signals below sensing head 154 such signals are amplified in pentode 142 to deliver control signals for the electronic switch 138 to control its control grid 11g. If f.i. information signal 157 in column 2 of the synchronizing area $156^{1-n}$ but in track 152 is sensed by signal head 154 the cathode ray deflected by the deflection system 128 has reached the field $160^2$, so that the amplified information signal delivered to control grid 119 effects via coupling capacitor $161^2$ the ignition of discharge tube $162^2$, whereas the preceding relay tube $162^1$ remains unaffected as within this column no information signal 157 has been sensed. After the running through of the tape through the information area synchronized by the synchronizing signals $156^{1-n}$ all those electronic relay tubes $162^{1-n}$ are effective which correspond to the said columns 2, 9, 11 and so on in which information signals are contained to indicate "9," as this area of the tape synchronized by the signals $156^{1-n}$ is to contain all the signals for the digit value "9."

The exciting of the relay tubes may have the same effect for the control of computers, printers, sorters, duplicators, parallel punching devices and so on, and other machinery which is effected by parallel brush sensing row "9" of a punched card, so that any desired alterations as to the sensed signals and the sequence in the computers, printers, duplicators, parallel punching devices may be obtained via switching panels and the like.

Within the gap between the recordings of adjacent unities the electronic tubes $162^{1-n}$ are switched back to their starting position so that within the sub-area of the tape synchronized by the signals $158^{1-n}$ those of the relay tubes $162^{1-n}$ may be effected anew which correspond within this sub-area to information signals representing digit values "8" and so on.

Fig. 20b shows a magnetizable rotatable record means to which the sensed signals from the synchronizing track 151 and the information track 152 may be transferred for a repeated or cyclic use. In using such tapes for the control of machinery it may be useful if the signals which have been sensed e.g. within one step movement of the unity $156^{1-n}$ indicating the start for this area of the tape, may be repeatedly and selectively used again, without the necessity of delivering said signals into relay arrangements as it is usually done with the known punched card machinery.

Such cyclic-operable storage means may be the magnetizable drum 174 fixed on shaft 168. This drum may be driven by motor 56 via a start stop friction clutch 64 arrested by engagement of projection 167 by armature 164 of the relay 65. If the relay 65 will be energized in dependence on starting signal 155 (Fig. 20a) via an amplifier and with the distributing means known from start stop teletyping and described in more detail in my co-pending application No. 498,041 filed March 30, 1955, the friction clutch 64 will rotate the magnetizable drum or disc 174 for instance for one rotation, if no further control signals would hold back the armature 166 of the start stop relay 65.

If the tape of Fig. 20a will be moved in the same stepwisely controllable way it might for instance be moved by one unity and the signals of both tracks 151 and 152 namely the synchronizing and the information signals will be transferred to the magnetizable drum or disc 174 moved by one cycle, the movement of each cycle being started by starting signals 155 controlling the start stop relay 65. In this case the tape may for instance remain stopped after the passing through of this unity and the same signals may be sensed repeatedly by a repeated cyclic movement of that drum controlled by start stop relay 65 stopping such a cyclic rotation only at that time instant when that cyclic operation is to be terminated.

The signals of one unity may be recorded in two parallel tracks, namely one synchronizing track and one information track via the signal heads $173^{1-n}$, and there may be a distributor 171 distributing via a distributing contact or an electronic or other comparable means to switching circuit $172^{0-n}$ which is co-ordinated to the sub-areas $156^{1-n}$, $158^{1-n}$ of Fig. 20a and so on, that is to say in accordance with the digit values which are represented within these sub-areas.

It is evident that at a higher rotation speed e.g. one twelve-fold one compared with that one before described in the preceding chapter, parallel tracks may receive successive recordings in such a way that each sub-area will deliver its correspondence signals including synchronizing and information signals to respective parallel tracks or the magnetizable drum if for each unity of the tape twelve such cyclic movements of the drum, disk or the like will take place.

If, during the recording a lateral movement of the recording heads $173^{1-n}$ is effected in one track, whereas the tape itself is moved on stepwisely by one unity, stepwisely displaced recordings are obtained, allowing a larger signal capacity on account of the distance between the parallel operating signal heads.

Fig. 2 shows that the distances between the parallel signal heads can be used for further recordings if the signal head system 10 (compare Fig. 2) is stepwisely moved laterally by a certain width after each cycle. The beginning of the tracks of a unity is then displaced by e.g. one or two hole-distances.

In this case it is also achieved, that the tape-feeding system must not move the tape 4 by a further unity, but only by a fraction of a unity, e.g. for one or two transport holes 22, so that a still larger speed of tape feeding can be achieved.

The checking of recorded or sensed signals can be effected in different ways. The first one is comparable to a second punching of punched cards, with a keyboard comprising contacts for comparing the digit value of the pressed down key contact with the sensed holes from the already punched cards. In this case the tape will be held in the described way by means of transport holes, in the same fixed position during the checking process as it has been held before during the recording process. For a comparison between the sensed signals whereby the sensing is e.g. effective according to the principle of Figs. 11 and 12, the actuated contacts can be compared with relays, tubes or the like actuated by the selectively sensed signals of the tape. The comparison takes place by e.g. a compensation winding on a coil as in the checking and comparison device of Fig. 22 or by bridge switching systems.

The checking can also be effected in that a second recording of signals takes place by a second person or at a different time in different tracks of a tape, which are e.g. displaced by one track laterally as shown before at Fig. 21. Both the recorded signals are then compared automatically by comparing means according to Fig. 22. The checking of recorded signals or effected operations insures freedom from spurious interference and great accuracy.

Figure 22:
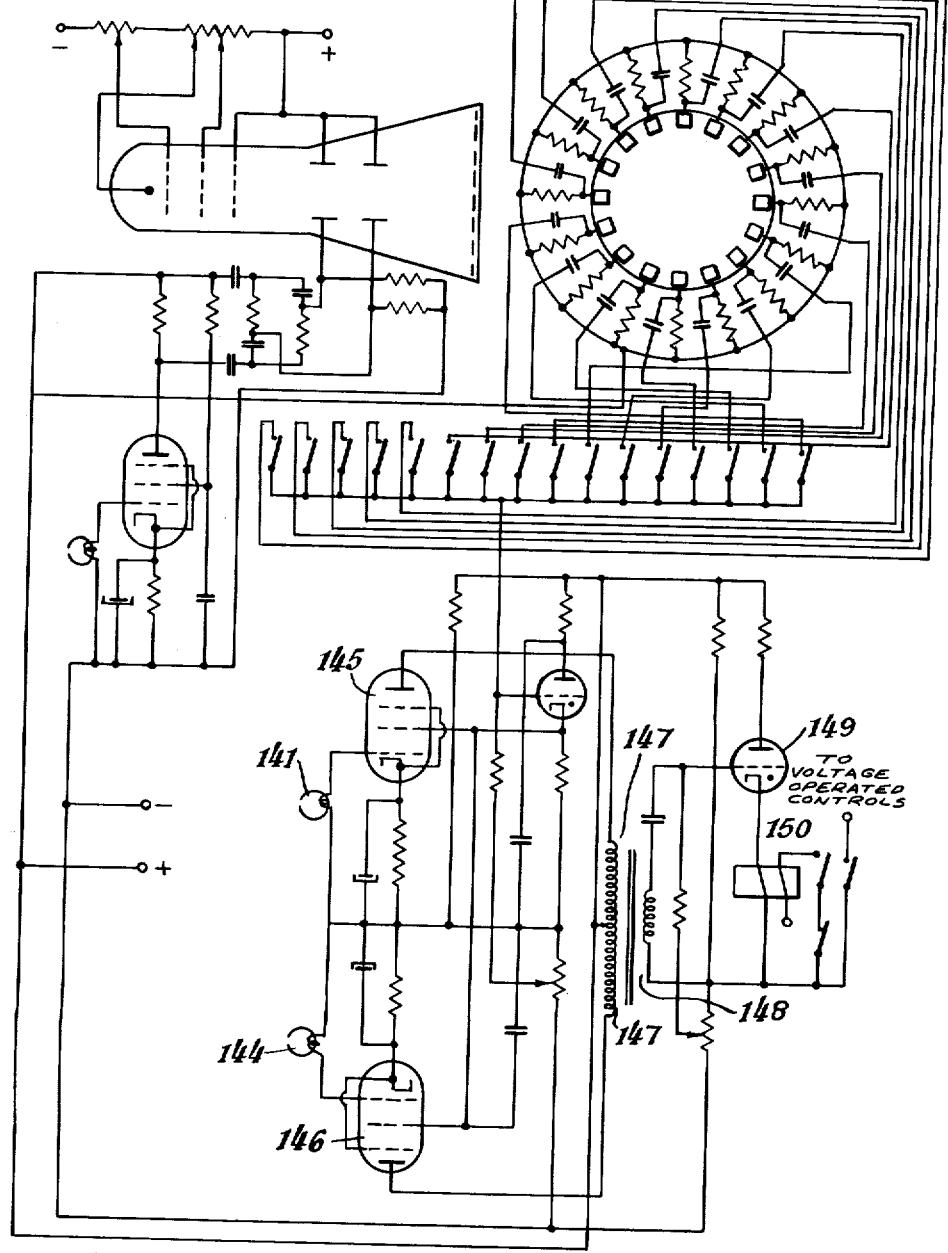
Fig. 22 illustrates one form of signal checking or comparing means.

If results, having been achieved by computing are computed twice, eventually even over separate electronic means, verifying of the computations at a highest degree of accuracy can be achieved by an automatic comparing of the resulting signals in a device according to Fig. 22. In telecomputing, telewriting etc. the same procedure of a second transfer and a comparison of the resulting signals within a device corresponding to the group control mechanism of Fig. 22 guarantees highest reliability. Thus the great reliability of electronic computing can be increased to a degree far above mechanical possibilities.

The checking device, illustrated in Fig. 22 compares the simplest way by means of two sensing heads 141 and 144, of which signal head 141 senses the original signals and signal head 144 senses the checking signals of the checking track. The two sensed signals are amplified respectively by pentodes 145 and 146 which operate according to the push-pull principle via push-pull transformer 147 with a common secondary winding 148. If signal head 141 as well as signal head 144 senses signals to be compared no voltage will be induced in the secondary winding 148. Therefore the gas discharge tube 149 is not excited. If on the contrary there is a signal only in one of the sensing heads 141 and 144 (bridge circuits) a voltage will be induced within the secondary winding 148 and the discharge tube 149 is ignited, actuating the relay 150 which indicates, that there is a difference between original and checking signals.

The checking of electronic processes e.g. electronic computing processes, can be effected likewise by an automatic comparing of intermediate or final result signals of a first operation with the same signals obtained in a second operation. The high speed of electronic computing permits complete recomputing and checking by comparing. The required checking and comparing devices correspond in principle to the devices of Fig. 22. In tele-computing i.e. at telecontrol of computers, telewriting etc. the same process may be effected by a comparison between signals received and recorded at a first transfer and such signals received and recorded at a second transfer. The comparing and checking means are the same as described above. The arrangement of Fig. 22 is described in more detail in my co-pending Application No. 498,058, filed March 30, 1955.

A further advantage of recording the symbolized signals on magnetic tapes is the possibility of a high transfer speed for the recorded signals, which is independent of the inertia of mechanically operating recording means at the receiver side, e.g. in form of the hitherto known electrically controlled punching of punched tapes.

What I claim is:

1. A signal storage arrangement, comprising, in combination, a magnetic recording head; a plurality of switch elements arranged in rows and columns, each element being alternatively settable to an on and an off condition; a magnetizable signal storage tape; drive means for driving said tape past said magnetic recording head; a first signal generating device operative to apply signals to said columns of elements in succession in synchronism with the movement of said tape past said recording head; means for deriving an output signal from a row of elements which includes an element in the on condition to which a signal is applied by said signal generating device; and means operative to energize said recording head to record a signal on said tape under control of said output signals.

2. A signal storage arrangement, comprising, in combination, a carrier means including a magnetizable signal storage layer, said carrier having a first signal storage track on said layer with synchronizing signals recorded therein, and a second signal storage track on said layer with information signals recorded therein; signal sensing means mounted for cooperation respectively with each of said tracks; moving means operative to move said carrier means to cause said tracks to be sensed by the respective signal sensing means to generate electrical signals representing said recorded synchronizing signals and information signals; a plurality of static storage devices each of which is settable to represent an item of information; a cyclically operating signal distributor means having an input and a plurality of outputs each connected to one of said static storage devices, said signal distributor means including a cathode ray tube having control electrodes, beam deflecting electrodes and a plurality of target electrodes arranged in arcuate fashion; means for applying said information representing electrical signals to a control electrode of said cathode ray tube to control the intensity of the electron beam of said cathode ray tube; phase-splitting circuit means for receiving said electrical signals representing said synchronizing signals and connecting said signals into out-of-phase signals with a relative phase difference of 90°; means for applying said out-of-phase signals to said beam deflecting electrodes to cause said beam to pass sequentially over said target electrodes; and means for deriving an output signal from each of said target electrodes.

3. A signal storage arrangement, comprising, in combination, a carrier means including a magnetizable signal storage layer, said carrier having a first signal storage track on said layer with synchronizing signals recorded therein, and a second signal storage track on said layer with information signals recorded therein; signal sensing means mounted for cooperation respectively with each of said tracks; moving means operative to move said carrier means to cause said tracks to be sensed by the respective signal sensing means to generate electrical signals representing said recorded synchronizing signals and information signals; a plurality of static storage devices each of which is settable to represent an item of information; a cyclically operating signal distributor means having an input and a plurality of outputs each connected to one of said static storage devices, said signal distributor means including a cathode ray tube having control electrodes, beam deflecting electrodes and a plurality of target electrodes arranged in linear fashion; means for applying said information representing electrical signals to a control electrode of said cathode ray tube to control the intensity of the electron beam of said cathode ray tube; sawtooth waveform generating circuit means having an input and an output; means for applying said electrical signals representing said synchronizing signals to the input of said sawtooth generating circuit means; means for coupling the output of said sawtooth generating circuit means to said beam deflecting electrodes to cause said beam to deflect across said target electrodes; and means for deriving an output signal from each of said target electrodes.

4. A signal storage arrangement, comprising, in combination, a magnetic recording head; a plurality of switch elements arranged in rows and columns, each element being alternatively settable to an on and an off condition; a magnetizable signal storage tape; drive means for driving said tape past said magnetic recording head; a first signal generating device operative to apply signals to said columns of elements in succession in synchronism with the movement of said tape past said recording head; means for deriving an output signal from a row of elements which includes an element in the on condition to which a signal is applied by said signal generating device, said output signal deriving means including a signal switching device operating in synchronism with the movement of said tape; and means operative to energize said recording head to record a signal on said tape under control of said output signals.

5. A signal storage arrangement, comprising, in combination, a carrier means including a magnetizable signal storage layer, said carrier having a first signal storage track on said layer with synchronizing signals recorded therein, and a second signal storage track on said layer with information signals recorded therein; signal sensing means mounted for cooperation respectively with each of said tracks; moving means operative to move said carrier means to cause said tracks to be sensed by the respective signal sensing means to generate electrical signals representing said recorded synchronizing signals and information signals; a plurality of static storage devices each of which is settable to represent an item of information; a cyclically operating signal distributor means having an input and a plurality of outputs each connected to one of said static storage devices, said signal distributor means including a cathode ray tube having control electrodes and a plurality of target electrodes, means for applying said information representing electrical signals to a control electrode of said cathode ray tube to control the intensity of the electron beams of said cathode ray tube; means responsive to said electrical signals representing said synchronizing signals to cause said beam to pass sequentially over said target electrodes; and means for deriving an output signal from each of said target electrodes.

References Cited in the file of this patent

UNITED STATES PATENTS

| | | |
|---|---|---|
| 2,427,421 | Reiber | Sept. 16, 1947 |
| 2,519,725 | White | Aug. 22, 1950 |
| 2,540,654 | Cohen | Feb. 6, 1951 |
| 2,554,835 | Mallina | May 29, 1951 |
| 2,648,589 | Hickman | Aug. 11, 1953 |